US011023730B1

(12) United States Patent
Zhou et al.

(10) Patent No.: US 11,023,730 B1
(45) Date of Patent: Jun. 1, 2021

(54) FINE-GRAINED VISUAL RECOGNITION IN MOBILE AUGMENTED REALITY

(71) Applicant: International Business Machines Corporation, Armonk, NY (US)

(72) Inventors: Bing Zhou, Port Jefferson Station, NY (US); Sinem Guven Kaya, New York, NY (US); Shu Tao, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/732,424

(22) Filed: Jan. 2, 2020

(51) Int. Cl.
*G06K 9/00* (2006.01)
*G06K 9/32* (2006.01)
(Continued)

(52) U.S. Cl.
CPC ....... *G06K 9/00671* (2013.01); *G06K 9/3233* (2013.01); *G06K 9/6256* (2013.01); *G06N 3/08* (2013.01); *H04B 1/3827* (2013.01)

(58) Field of Classification Search
CPC ............. G06K 9/00671; G06K 9/3233; G06K 9/6256; G06K 9/6211; G06K 9/00214; G06K 9/6202; G06K 9/6215; G06K 9/00208; G06K 9/00248; G06K 9/00335; G06K 9/0063; G06K 9/00637; G06K 9/00664; G06K 9/4671; G06N 3/08; H04B 1/3827; G06T 2207/10028;
(Continued)

(56) References Cited

U.S. PATENT DOCUMENTS 6,711,293 B1    3/2004  Lowe
8,379,014 B2    2/2013  Wiedemann et al.
(Continued)

FOREIGN PATENT DOCUMENTS

CN    106407974 A    2/2017
CN    109949375 A    6/2019
KR    20090050567 A   5/2009

OTHER PUBLICATIONS

Zhou et al., Pose-assisted Active Visual Recognition in Mobile Augmented Reality, In Proceedings of the 24th Annual International Conference on Mobile Computing and Networking (MobiCom '18). ACM, 756-758. 2018.
(Continued)

*Primary Examiner* — Michael S Osinski
(74) *Attorney, Agent, or Firm* — Anthony Curro; Otterstedt, Wallace & Kammer, LLP

(57) ABSTRACT

Obtain access to a three-dimensional point cloud representation of an object including poses of a scanning digital camera and corresponding video frames. Down-sample the three-dimensional point cloud representation to obtain a set of region-of-interest candidates. Filter the region-of-interest candidates to select those of the region-of-interest candidates having appearance changes, which distinguish different visual states, as selected regions of interest, based at least in part on the poses of the camera. Generate region of interest images for the selected regions of interest from corresponding ones of the video frames; and train a deep learning recognition model based on the region of interest images. the trained deep learning recognition model can be used, for example, to determine a visual state of the object for repair instructions.

25 Claims, 23 Drawing Sheets

(51) Int. Cl.
*G06N 3/08* (2006.01)
*G06K 9/62* (2006.01)
*H04B 1/3827* (2015.01)

(58) Field of Classification Search
CPC . G06T 2207/30244; G06T 7/73; G06T 7/248;
G06T 7/579; G06T 7/75; G06T 7/55;
G06T 7/60; G06T 7/33; G06T 7/337;
G06T 7/50; G06T 7/74; G06T 7/97;
G06T 17/00; G06T 17/05
See application file for complete search history.

(56) References Cited

U.S. PATENT DOCUMENTS

| | | | |
|---|---|---|---|
| 9,846,996 B1 | 12/2017 | Moore | |
| 2009/0110241 A1* | 4/2009 | Takemoto | H04N 13/207 382/103 |
| 2012/0237085 A1 | 9/2012 | Meier | |
| 2013/0108116 A1* | 5/2013 | Suzuki | G06T 7/75 382/106 |
| 2013/0245828 A1* | 9/2013 | Tateno | G06T 7/75 700/259 |
| 2015/0127161 A1* | 5/2015 | Satou | B25J 9/1697 700/259 |
| 2015/0243072 A1* | 8/2015 | Haglund | G06T 17/05 345/419 |
| 2015/0325047 A1 | 11/2015 | Conner et al. | |
| 2016/0125617 A1* | 5/2016 | Yamaguchi | G06T 7/74 382/154 |
| 2016/0154994 A1* | 6/2016 | Kim | G06K 9/00208 382/118 |
| 2016/0232259 A1 | 8/2016 | Williams | |
| 2016/0239976 A1* | 8/2016 | Fathi | G06T 7/579 |
| 2017/0084037 A1* | 3/2017 | Barajas Hernandez | G06K 9/00637 |
| 2017/0132808 A1* | 5/2017 | Heinonen | G06T 7/97 |
| 2017/0177937 A1* | 6/2017 | Harmsen | G06K 9/00624 |
| 2017/0193679 A1* | 7/2017 | Wu | G06T 19/00 |
| 2017/0213373 A1* | 7/2017 | Yamao | G06T 7/73 |
| 2017/0300778 A1* | 10/2017 | Sato | G06K 9/6215 |
| 2017/0316612 A1* | 11/2017 | Moteki | G06T 7/73 |
| 2017/0345184 A1* | 11/2017 | Tsubota | G06K 9/6211 |
| 2018/0182163 A1* | 6/2018 | Tung | G06T 17/05 |
| 2019/0056779 A1 | 2/2019 | Guven et al. | |
| 2019/0098215 A1* | 3/2019 | Narita | H04N 5/23258 |
| 2019/0188906 A1* | 6/2019 | Krishna | G08G 5/0069 |
| 2019/0206074 A1* | 7/2019 | Oryoji | G06T 17/20 |
| 2019/0244008 A1 | 8/2019 | Rivera et al. | |
| 2019/0265734 A1* | 8/2019 | Liu | G05D 1/106 |
| 2019/0304128 A1* | 10/2019 | Myeong | G06T 7/97 |
| 2019/0318151 A1* | 10/2019 | Shichijo | G06K 9/00845 |
| 2019/0337343 A1 | 11/2019 | Ramirez Llanos | |
| 2019/0377966 A1 | 12/2019 | Wang | |
| 2019/0379836 A1* | 12/2019 | Mori | G06T 7/70 |
| 2020/0012877 A1* | 1/2020 | Kotake | G06K 9/3208 |
| 2020/0050833 A1* | 2/2020 | Ogasawara | G06T 7/00 |
| 2020/0064471 A1* | 2/2020 | Gatland | H04N 13/388 |
| 2020/0111222 A1* | 4/2020 | Asmari | G06T 7/579 |
| 2020/0111267 A1* | 4/2020 | Stauber | G02B 27/017 |
| 2020/0184658 A1* | 6/2020 | Cui | G06K 9/6211 |
| 2020/0187881 A1* | 6/2020 | Lim | A61B 6/5247 |
| 2020/0258299 A1* | 8/2020 | Kobayashi | G06T 15/20 |
| 2020/0342250 A1* | 10/2020 | Smirnov | G06T 7/10 |
| 2020/0349765 A1* | 11/2020 | Iwamoto | G06K 9/00 |
| 2020/0357136 A1* | 11/2020 | Qiao | G06T 7/73 |
| 2020/0388004 A1* | 12/2020 | Zhang | G06T 3/0075 |

OTHER PUBLICATIONS

Phillips et al., ORB-Based Multiple Fixed Resolution Approach for On-Board Visual Recognition, In: Wang D., Zhang LJ. (eds) Artificial Intelligence and Mobile Services—AIMS 2019. AIMS 2019. Lecture Notes in Computer Science, vol. 11516. Springer, pp. 54-71, 2019.

Gao et al., Object registration in semi-cluttered and partial-occluded scenes for augmented reality, Multimedia Tools and Applications, Jun. 2019, vol. 78, iss.11, pp. 15079-15099.

Cheng et al., Geometry-Aware Recurrent Neural Networks for Active Visual Recognition, 32nd Conference on Neural Information Processing Systems (NeurIPS 2018), Montréal, Canada http://papers.nips.cc/paper/7755-geometry-aware-recurrent-neural-networks-for-active-visual-recognition.

Su et al., Multi-view Convolutional Neural Networks for 3D Shape Recognition, 2015 IEEE International Conference on Computer Vision (ICCV), Santiago, 2015, pp. 945-953.

Anonymous, Using Augmented Reality to Enhance Diagnostics, Repair and Assembly, IP.com Disclosure No. IPCOM000223150D, Publication Date: Nov. 5, 2012.

Jayaraman et al., End-to-end policy learning for active visual categorization, IEEE Transactions on Pattern Analysis and Machine Intelligence, 41, No. 7, 2018, pp. 1601-1614.

Wu et al., 3d shapenets: A deep representation for volumetric shapes, In Proceedings of the IEEE conference on computer vision and pattern recognition, 2015, pp. 1912-1920.

Kanezaki et al., RotationNet: Joint Object Categorization and Pose Estimation Using Multiviews from Unsupervised Viewpoints, In Proceedings of the IEEE Conference on Computer Vision and Pattern Recognition, 2018, pp. 5010-5019.

Johns et al., Pairwise decomposition of image sequences for active multi-view recognition, In Proceedings of the IEEE Conference on Computer Vision and Pattern Recognition, 2016, pp. 3813-3822.

Su et al., Multi-view convolutional neural networks for 3d shape recognition, In Proceedings of the IEEE international conference on computer vision, 2015, pp. 945-953.

Ren et al., Faster r-cnn: Towards real-time object detection with region proposal networks, In Advances in neural information processing systems, 2015, pp. 91-99.

Zhang et al., Picking deep filter responses for fine-grained image recognition, In Proceedings of the IEEE Conference on Computer Vision and Pattern Recognition, 2016, pp. 1134-1142.

Krizhevsky et al., Imagenet classification with deep convolutional neural networks, In Advances in neural information processing systems, 2012, pp. 1097-1105.

Zhang et al., Part-based R-CNNs for fine-grained category detection, In European conference on computer vision, Springer, pp. 834-849, 2014.

Huang et al., Part-stacked cnn for tine-grained visual categorization, In Proceedings of the IEEE conference on computer vision and pattern recognition, 2016, pp. 1173-1182.

Zheng et al., Learning multi-attention convolutional neural network for fine-grained image recognition, In Proceedings of the IEEE international conference on computer vision, 2017, pp. 5209-5217.

Branson et al., Bird species categorization using pose normalized deep convolutional nets, arXiv preprint arXiv:1406.2952, 2014.

Lin et al., Bilinear cnn models for fine-grained visual recognition. In Proceedings of the IEEE international conference on computer vision, 2015, pp. 1449-1457.

Krause et al., Fine-grained recognition without part annotations. In Proceedings of the IEEE Conference on Computer Vision and Pattern Recognition, 2015, pp. 5546-5555.

Hagbi et al., Shape recognition and pose estimation for mobile augmented reality, IEEE transactions on visualization and computer graphics 17, No. 10, 2010, pp. 1369-1379.

Agarap, Deep learning using rectified linear units (relu), arXiv preprint arXiv:1803.08375 (2018), 7 pages.

Apple 2018. Apple Developer Documentation, 5 pages, downloaded Feb. 24, 2020 from https://developer.apple.com/documentation. (2018).

Chollet and others, 2015, Keras, 5 pages, downloaded Feb. 24, 2020 from https://keras.io.

Deng et al., Imagenet: A large-scale hierarchical image database, In 2009 IEEE conference on computer vision and pattern recognition, pp. 248-255. IEEE, 2009.

Google, 2019, Google ARCore SDK, 2 pages, downloaded Feb. 24, 2020 from https://developers.google.com/ar/. (2019).

(56) References Cited

OTHER PUBLICATIONS

He et al., Deep residual learning for image recognition, In Proceedings of the IEEE conference on computer vision and pattern recognition, pp. 770-778. 2016.
Hochreiter et al., Long short-term memory, Neural computation 9, No. 8 (1997), pp. 1735-1780.
Leutenegger et al., Keyframe-based visual-inertial odometry using nonlinear optimization, The International Journal of Robotics Research 34, No. 3, 2015, pp. 314-334.
Mahendran et al., Visualizing deep convolutional neural networks using natural pre-images, International Journal of Computer Vision 120, No. 3, 2016, pp. 233-255.
Rublee et al., ORB: An efficient alternative to SIFT or SURF, In 2011 International conference on computer vision, pp. 2564-2571. IEEE, 2011.
Rusu wt al., 3d is here: Point cloud library (pcl), In 2011 IEEE international conference on robotics and automation, pp. 1-4. IEEE, 2011.
Selvaraju et al., Grad-cam: Visual explanations from deep networks via gradient-based localization. In Proceedings of the IEEE international conference on computer vision, pp. 618-626. 2017.
Simonyan et al., Very deep convolutional networks for large-scale image recognition. arXiv preprint arXiv:1409.1556, 2014.
Yan et al., Spatial temporal graph convolutional networks for skeleton-based action recognition, In Thirty-second AAAI conference on artificial intelligence, 2018.
Xie, Jiani, CN as ISA. Patent Cooperation Treaty International Search Report and Written Opinion, PCT/IB2020/062376, dated Apr. 9, 2021, 9 pages.

\* cited by examiner

ACCUMULATED POINT CLOUD
505

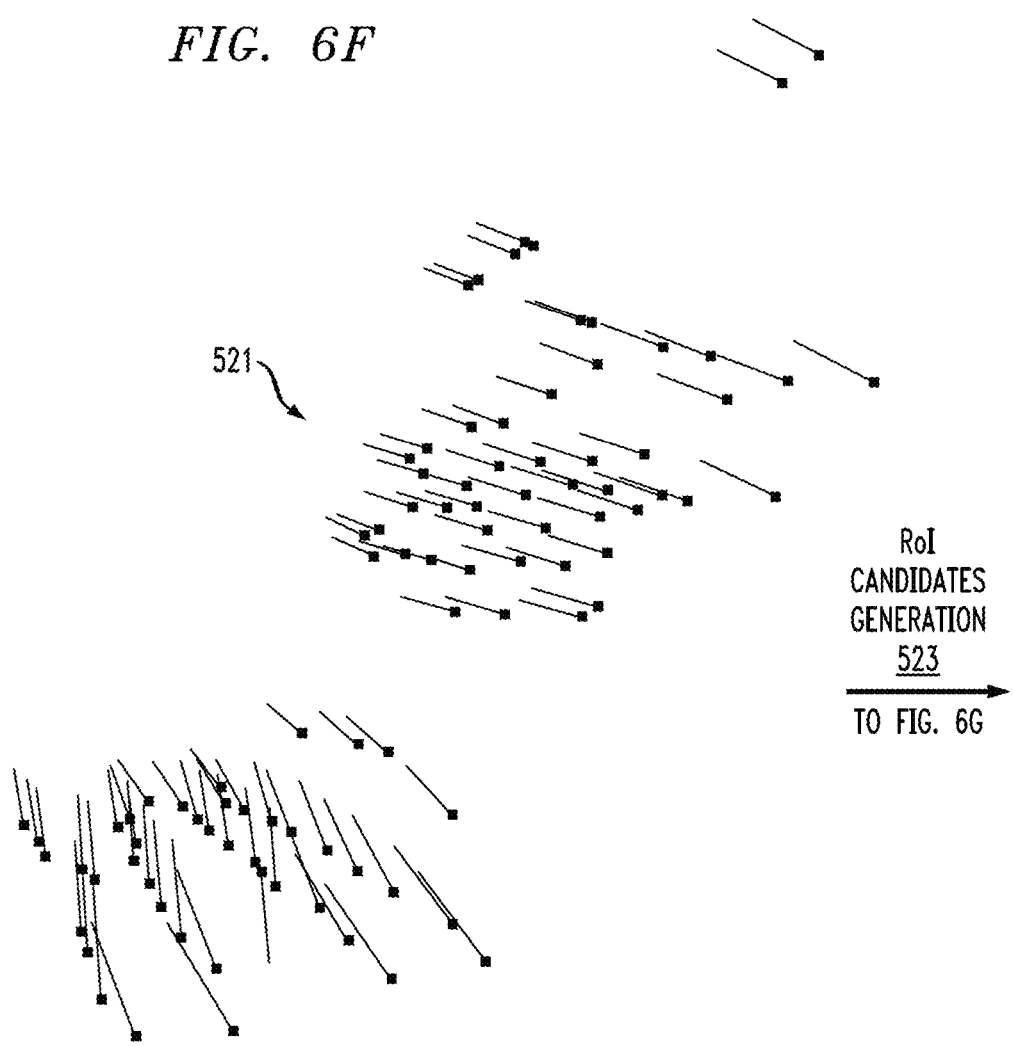

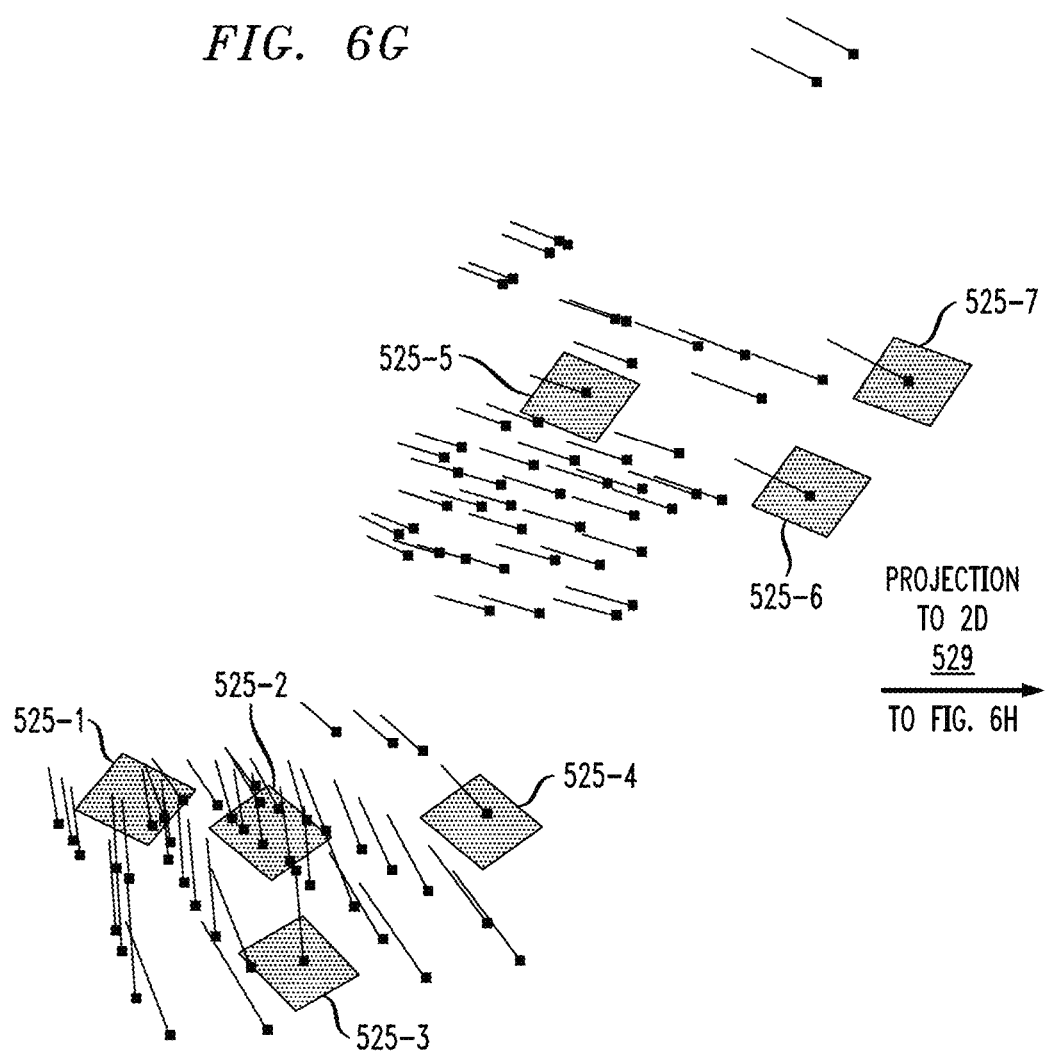

FIG. 19
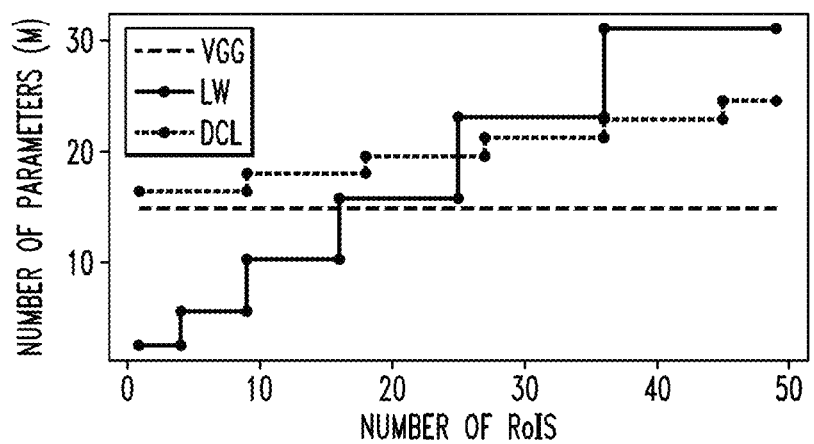
FIG. 20
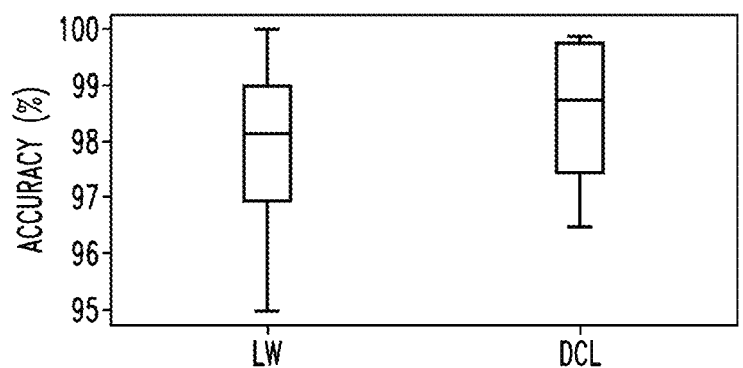
FIG. 21
| MODE | CPU | MEMORY |
|---|---|---|
| AR | 7.16% | 134.9 MB |
| AR + LW | 8.33% | 168.4 MB |
| AR + DCL | 8.67% | 178.9 MB |

FINE-GRAINED VISUAL RECOGNITION IN MOBILE AUGMENTED REALITY

BACKGROUND

The present invention relates to the electrical, electronic and computer arts, and more specifically, to augmented reality (AR) systems and the like.

Augmented Reality (AR) enhances the perception of surroundings by overlaying media and graphics on top of what is seen in the real world. Over the last decade, major progress has been made and there has been increased interest in AR. Despite this progress, most AR user experiences remain primitive, and lack intelligence and automation, which make user interaction rather unintuitive. Although AR enables tracking of virtual objects and annotations in physical spaces through computer vision techniques, it is not inherently intelligent to actually recognize semantics of what it sees. For example, in the technical support domain, AR can recognize a laptop in the form of a point cloud to enable tracked annotations on top of the laptop, but it does not actually know that it is looking at a laptop without the user labelling that particular point cloud to be of a laptop. Nor would AR be able to understand if the laptop's cover was open or closed, or that the laptop has its heat sink removed, and so on. Current techniques require all interaction to be driven by the user identifying what the user is looking at (e.g., through pre-labelling objects, specifying the state of an object, etc.) before the user can have the relevant AR content projected to the user's view, thereby significantly limiting the interaction.

SUMMARY

Principles of the invention provide techniques for fine-grained visual recognition in mobile augmented reality. In one aspect, an exemplary method includes the step of obtaining access to a three-dimensional point cloud representation of an object including poses of a scanning digital camera and corresponding video frames; down-sampling the three-dimensional point cloud representation to obtain a set of region-of-interest candidates; filtering the region-of-interest candidates to select those of the region-of-interest candidates having appearance changes, which distinguish different visual states, as selected regions of interest, based at least in part on the poses of the camera; generating region of interest images for the selected regions of interest from corresponding ones of the video frames; and training a deep learning recognition model based on the region of interest images.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

fine-grained visual recognition of the state of an item, such as a machine under repair, robust against occlusions such as from user's hand or tools, robust to camera movements and ignores blurred images automatically.

These and other features and advantages of the present invention will become apparent from the following detailed description of illustrative embodiments thereof, which is to be read in connection with the accompanying drawings.

BRIEF DESCRIPTION OF THE DRAWINGS

FIG. 19 depicts the total number of parameters of different models as the number of ROIs increases, according to an aspect of the invention;

FIG. 20 shows exemplary accuracy of lightweight (LW) convolutional neural network (CNN) and Discrete-CNN-LSTM (DCL; LSTM=long short-term memory) models on five objects, achieved with exemplary embodiment(s) of the invention;

FIG. 21 is a table showing resource consumption under different modes, achieved with exemplary embodiment(s) of the invention.

DETAILED DESCRIPTION

Figure 1:
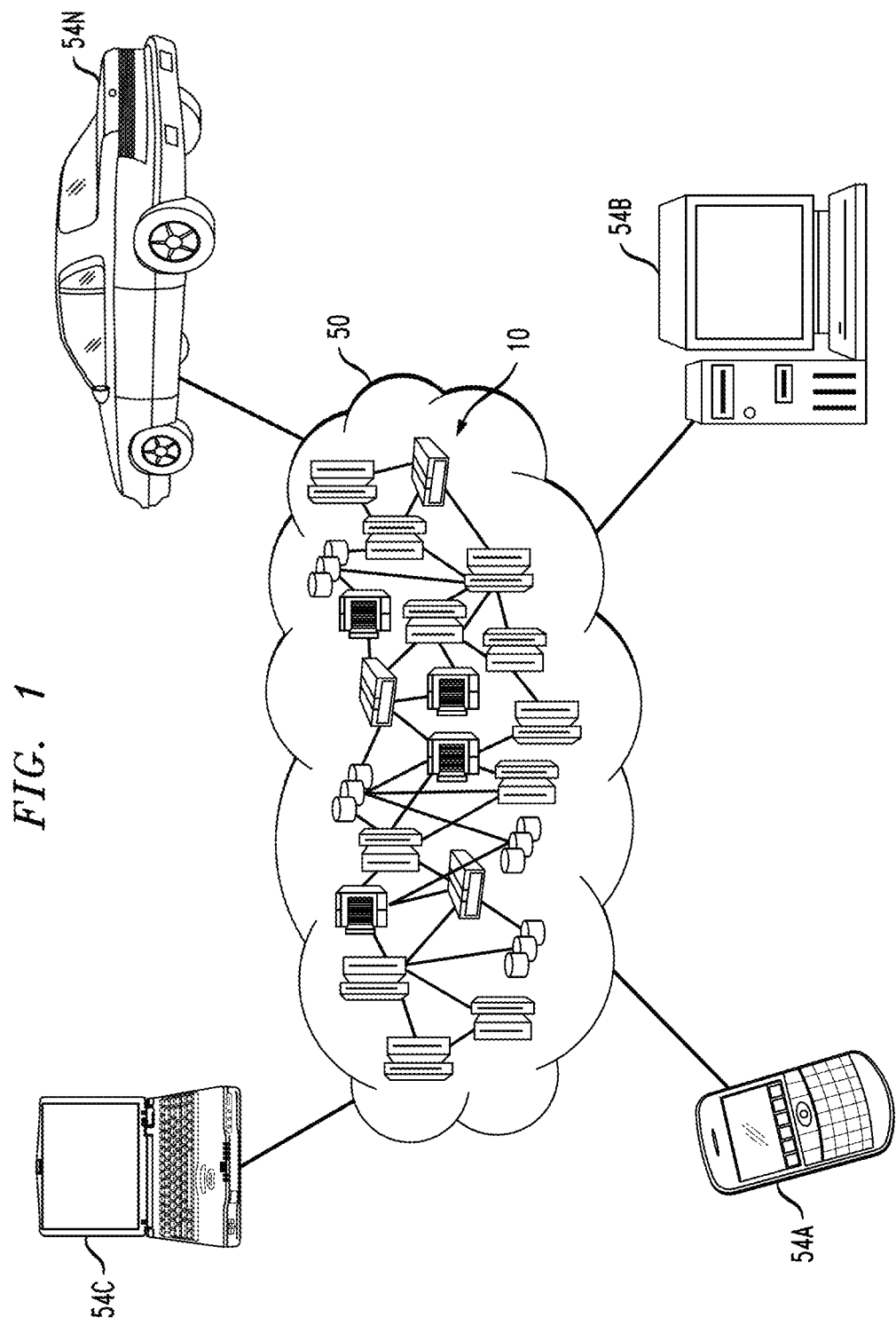
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
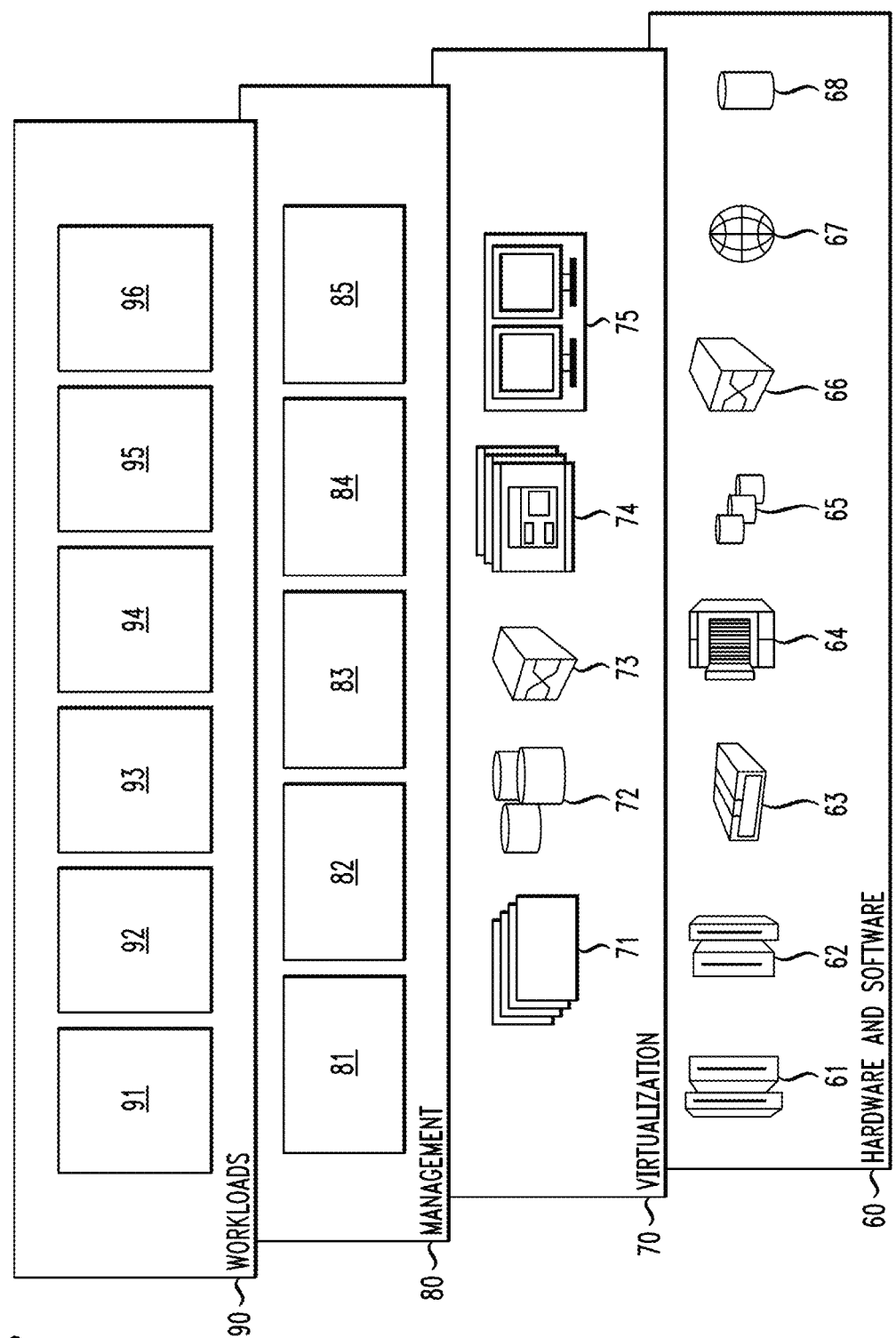
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service for fine-grained visual recognition in mobile augmented reality 96, it being understood that cloud, non-cloud/local, and combined approaches could be employed. For example, some embodiments reside on a user' smart phone, laptop, or other mobile device 54A, 54C and optionally interact with elements in the cloud.

One or more embodiments advantageously provide a system and method for augmented reality driven visual recognition. Despite the recent advances in Augmented Reality (AR), most AR user experiences remain primitive, and lack intelligence and automation, which make user interaction rather unintuitive. Although AR enables tracking of virtual objects and annotations in physical spaces through computer vision techniques, it is not inherently intelligent to actually recognize semantics of what it sees. For example, in the technical support domain, AR can recognize a laptop in the form of a point cloud to enable tracked annotations on top of the laptop, but it does not actually know that it is looking at a laptop without the user labeling that particular point cloud to be of a laptop. Nor would AR be able to understand if the laptop's cover was open or closed, or that the laptop has its heat sink removed, and so on. The lack of semantic, fine-grained recognition requires all interaction to be driven by the user by identifying what the user is looking at (e.g., through pre-labelling objects, specifying the state of an object, etc.) before the user can have the relevant AR content projected to the user's view, and thereby significantly limits the interaction. To address this gap and provide enriched AR user experiences, one or more embodiments provide a more fine-grained visual recognition approach, which recognizes not only objects but also parts of or state change(s) of an object. This approach enables AR applications to automatically render the relevant AR instructions in the right context by detecting the state change of a part of an object.

Recognizing fine-grained categories (e.g., car models, bird species) is a very challenging problem as it requires the capability of localizing and identifying marginal visual differences. Most existing work relies on human-annotated data sets leveraging bounding boxes to represent relevant features, but this is very difficult to scale. Weakly-supervised part models using convolutional neural networks (CNNs) with category labels have no dependencies on bounding boxes for data labeling, hence greatly increasing their applicability. Such approaches include two steps: part localization by training from positive/negative image patches and then extracting fine-grained features for recognition. However, these approaches are not directly applicable where dynamic camera movements bring noise to the captured images. Similarly, a Region Proposal Network (RPN) does not work well in complex scenarios, such as state recognition for hardware repair, since many parts (e.g., RAM sticks, screws) may look identical, yet a combination of those can represent different state(s) of the hardware. Such RPN-based models lack the ability to focus on specific parts of interest. Existing approaches share the same assumption that the distinguishable parts are adequately captured in input images, which may not always be the case in practice.

Prior-art techniques typically either assume input images taken from twelve fixed viewing angles around the object (azimuth angles with a step of 30°), or use random images in a group or pairwise form. Unlike prior systems which assume that the user knows how and where to take the input images, one or more embodiments guide the user to capture images from the most informative Regions of Interest (ROIs), based on the camera pose and the 3-D point cloud representing the target object.

Active recognition typically involves learning a generative model of the object, and then selecting views based on entropy reduction. Recently, the "ShapeNets" framework has been proposed to model objects as a voxel grid, and to learn a generative model based on convolutional deep belief networks to allow for view synthesis from unseen viewpoints. An end-to-end policy learning for active visual categorization, and a framework for exploring unseen environments for unknown tasks, have also been proposed. However, such models typically cannot guarantee the completeness of the perception of the object such that all pertinent parts are captured.

One or more embodiments advantageously provide a solution that takes advantage of AR-specific data, such as real-time generated 3-D feature points and camera pose(s), to complement the images captured by the camera for fine-grained visual recognition. First, use a set of training videos and learn ROIs, which have appearance changes that distinguish different states. Actively track the 6-DOF camera pose to ensure that the camera is kept at the right distance and viewing angle to the ROIs, and to minimize occlusions or other noise to the input images of the visual recognition model. To improve the robustness of recognition, one or more embodiments provide a discrete multi-stream Convolutional Neural Network (CNN), in conjunction with bi-directional Long Short Term Memory (LSTM), namely, a Discrete-CNN-LSTM (DCL) model, to extract not only spatial, but also temporal data to predict state changes.

One or more embodiments address the unique problem of fine-grained visual recognition in a mobile AR setting, and combine image, 3-D feature point and camera pose data to actively predict object state changes. One or more embodiments generate ROI candidates from merged 3-D feature points collected from AR sessions, and automatically extract distinguishable ROIs using deep CNN feature representations, which are tracked and cropped for fine-grained recognition. One or more embodiments employ an inventive Discrete-CNN-LSTM (DCL) model, with distributes ROI images on discrete multi-stream CNN branches and aggregates information with bi-directional LSTM layers. Multi-stream CNN with shared weights solves the contradictory problem between high image resolution required for fine-granularity (and thus larger model size), and the shrinking resolution as the number of ROIs increases. The LSTM layers aggregate the visual information in the temporal domain to further enhance the prediction stability. In a non-limiting exemplary experimental embodiment, an iOS application was built using an AR development platform (Apple's ARKit augmented reality development platform for iOS) and an end-to-end machine learning platform (the open-source TensorFlow platform) to demonstrate effectiveness and provide comprehensive evaluations using the hardware maintenance application scenario.

Figure 3B:
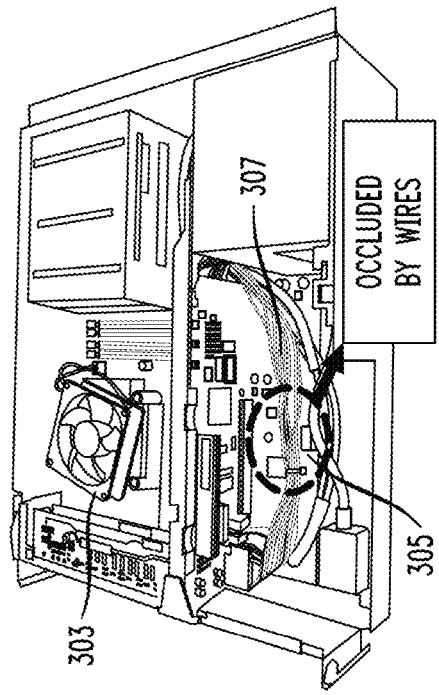
FIGS. 3A, 3B, 3C, and 3D depict exemplary visual states of a computer which can be detected using embodiments of the invention.

Augmented reality (AR) is currently used for a variety of purposes, including technical support. AR systems are computerized vision systems that overlay the real world with virtual material. Augmented self-assist involves superimposing step-by-step three-dimensional (3-D) animated instructions onto images of the hardware to be worked on; it is more intuitive and engaging than previous systems. Previous systems, due to lack of fine-grained visual recognition, have typically required human analysis and a manual choice of an applicable set of instructions to view. One or more embodiments advantageously recognize the state of the object and the repair and automatically provide a correct set of instructions. As defined herein, a 'visual state' of an object refers to the visual configuration of an object, such as a machine under repair, at a given point in time; e.g., battery installed/not installed, latch up or down—a characteristic of an object that is present, as opposed to mere absence/presence of the object per se. In the battery example, the "visual state" is the state of the motherboard as opposed to the battery. In one or more embodiments, this is enabled by fine-grained visual recognition, heretofore not available. Refer to FIG. 3A. It is desired to determine whether the fan 303 and/or battery 305 have been removed. Because of the distance from the camera, it is difficult to determine whether the battery has been removed, and thus, it is appropriate to "zoom in," as in FIG. 3C. In FIG. 3B, another potential problem can be seen; namely, the battery 305 is occluded by wires 307. In FIG. 3-D, yet another potential problem can be seen; namely, the battery 305 is occluded by the user's hand 309. Note also CPU 311.

One or more embodiments advantageously provide a visual recognition system which recognizes the visual state of the machine under repair, which can provide, for example, the following three functionalities:

Present corresponding AR instructions automatically.
Verify that all pre-requisites are met to move to next step.
Answer the question "Where am I?" (Recognize the state of the machine after an interrupted repair process).

One or more embodiments provide very fine-grained perception of the object. The object can advantageously be viewed from an appropriate viewing angle such that key components are visible to the camera. One or more embodiments enable zooming in to local areas of the image; for example, to detect whether a small screw is installed or missing (or other fine-grained detail). The object may be temporarily occluded by the users' hand or tools (FIG. 3D), which brings "noise" to the images.

Additionally, unlike traditional visual recognition scenarios which take well-taken images as input, the input images in AR scenarios are captured from a dynamic moving camera. One or more embodiments address the challenges to reliable and stable recognition results due to partially captured images or blurred images caused by fast camera movements.

Figure 4:
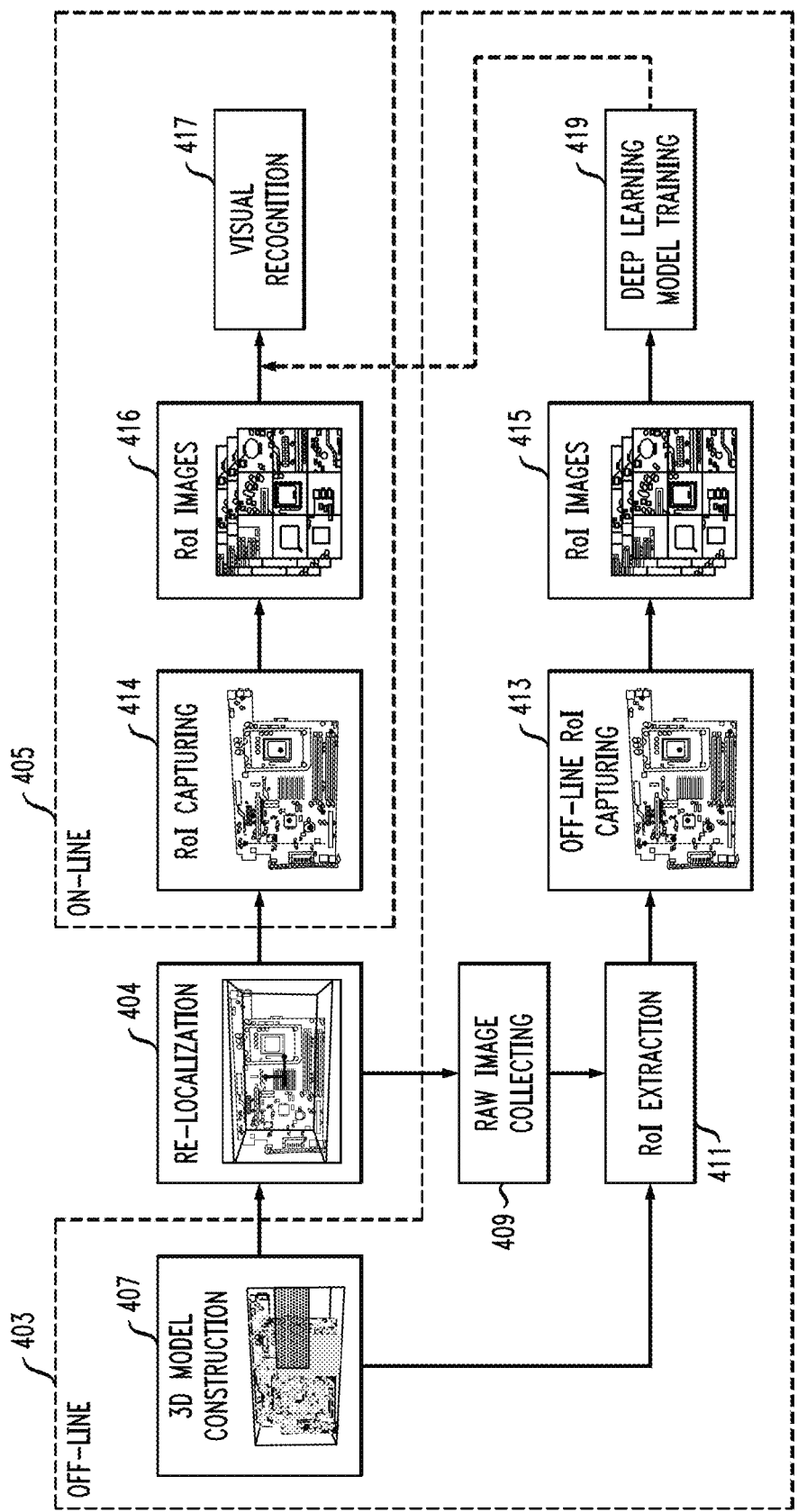
FIG. 4 is a combined data flow/block diagram, according to an embodiment of the invention.

Heretofore, current visual recognition algorithms have not been able to provide good results in such problematic cases. One or more embodiments advantageously provide a framework capable of fine-grained recognition. Referring to FIG. 4, one or more embodiments include an off-line phase 403 and an on-line phase 405. For the off-line phase, because of the AR, objects can be scanned with a camera to detect three-dimensional (3-D) feature points of the object, and track the object's pose, orientation, and location of the camera. In one or more embodiments, in the off-line phase, first scan the object so that a 3-D model of the object can be constructed, at 407. In the meantime, capture video frames/images of the object at 409. The captured data is employed for ROI (region of interest) extraction 411. For example, the battery and CPU fan are regions of interest. One or more embodiments employ algorithms to automatically extract such ROIs (offline ROI capture) 413.

Once the ROIs are captured (off-line 413, on-line 414), one or more embodiments determine ROI images (off-line 415, on-line 416)—this can involve, for example, calculations to determine how to crop thumbnail images, as well as concatenation of thumbnails. For example, concatenate a number of images of interest (in a non-limiting example at 541 and 803-1, 803-2, . . . , 803-M, nine images in a three-by-three arrangement) (such as the battery, CPU, chip, and the like); the concatenated images can be used for visual recognition 417 during the on-line phase 405. In one or more embodiments, during the off-line phase 403, a deep learning model is trained at 419 based on the concatenated images 415. The model is used on-line in real time for visual recognition 417.

In one or more embodiments the visual recognition is a two-step process: (i) ROI extraction 411 and (ii) ROI concatenation and visual recognition. One or more embodiments thus do not feed the entire image into the model for visual recognition.

FIG. 4 thus shows pertinent steps for the system design, which can be divided into off-line 403 and on-line 405 phases. In the off-line phase 403, at 407, first scan the object (e.g. with a mobile device) to construct the object model, which is a 3-D point cloud representation of the object, which can be used for re-localization 404. During the scanning, collect the camera poses and detected point clouds and video frames, at 409. The ROI extraction down-samples the 3-D point cloud representation from the object model at 411 to generate a set of ROI candidates, which are further filtered at 413 (e.g. due to (i) blurring caused be excessively fast camera motion and/or (ii) occlusion of the region of interest) such that only those ROIs that have appearance changes are selected. Based on the selected ROIs, crop the saved frames to generate ROI images 415, which are used for recognition model training 419.

In the on-line phase 405, first detect the object using the object model and re-localize the mobile device with respect to the object at 404, such that the extracted ROIs stay on the same positions with respect to the object. Based on these ROIs on the object, at 414 zoom into each ROI and crop the local high resolution images, which are further processed to obtain images 416 used for visual recognition 417 (on-line) (images 415 are used for model training 419 (off-line)). Based on the recognized "state" of the object, corresponding AR instructions are automatically presented.

Figure 5:
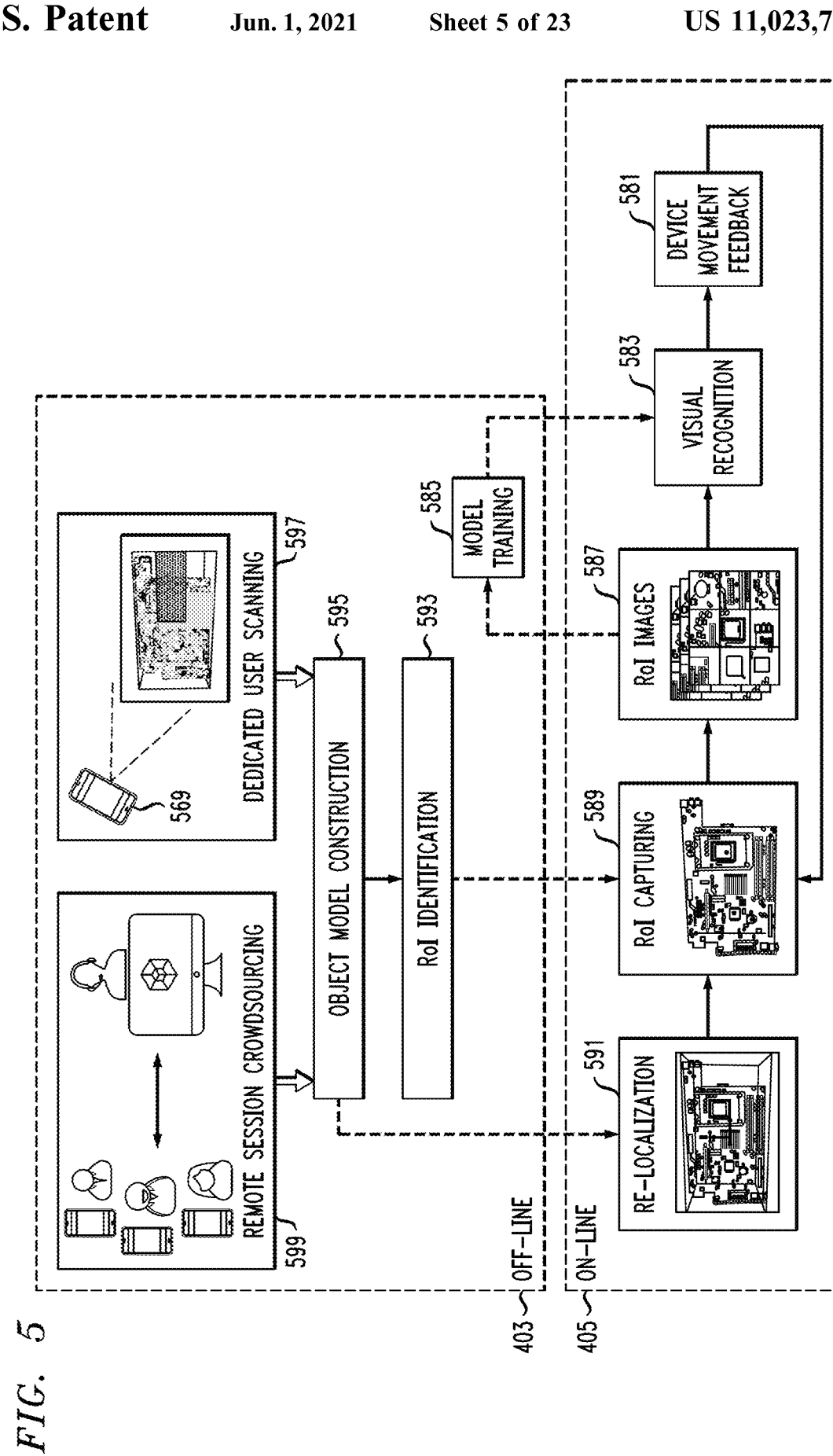
FIG. 5 is an alternative combined data flow/block diagram, according to an embodiment of the invention.
Figure 6A:
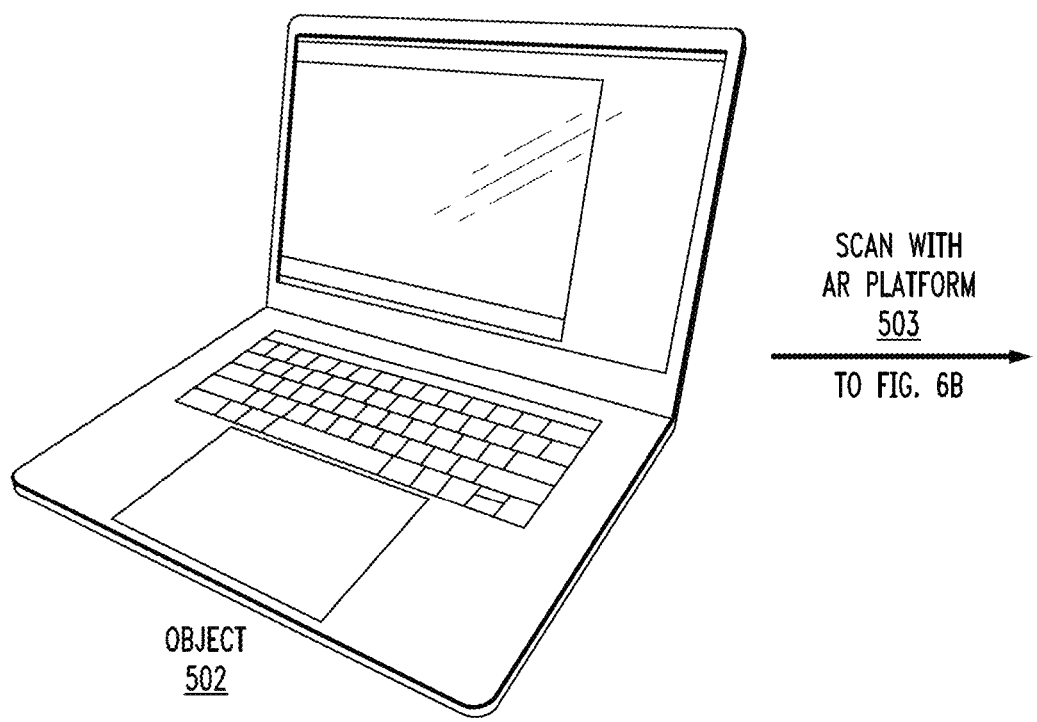
FIG. 6 shows an exemplary process for region of interest (ROI) generation, according to an embodiment of the invention.
Figure 6B:
Figure 6C:
Figure 6D:
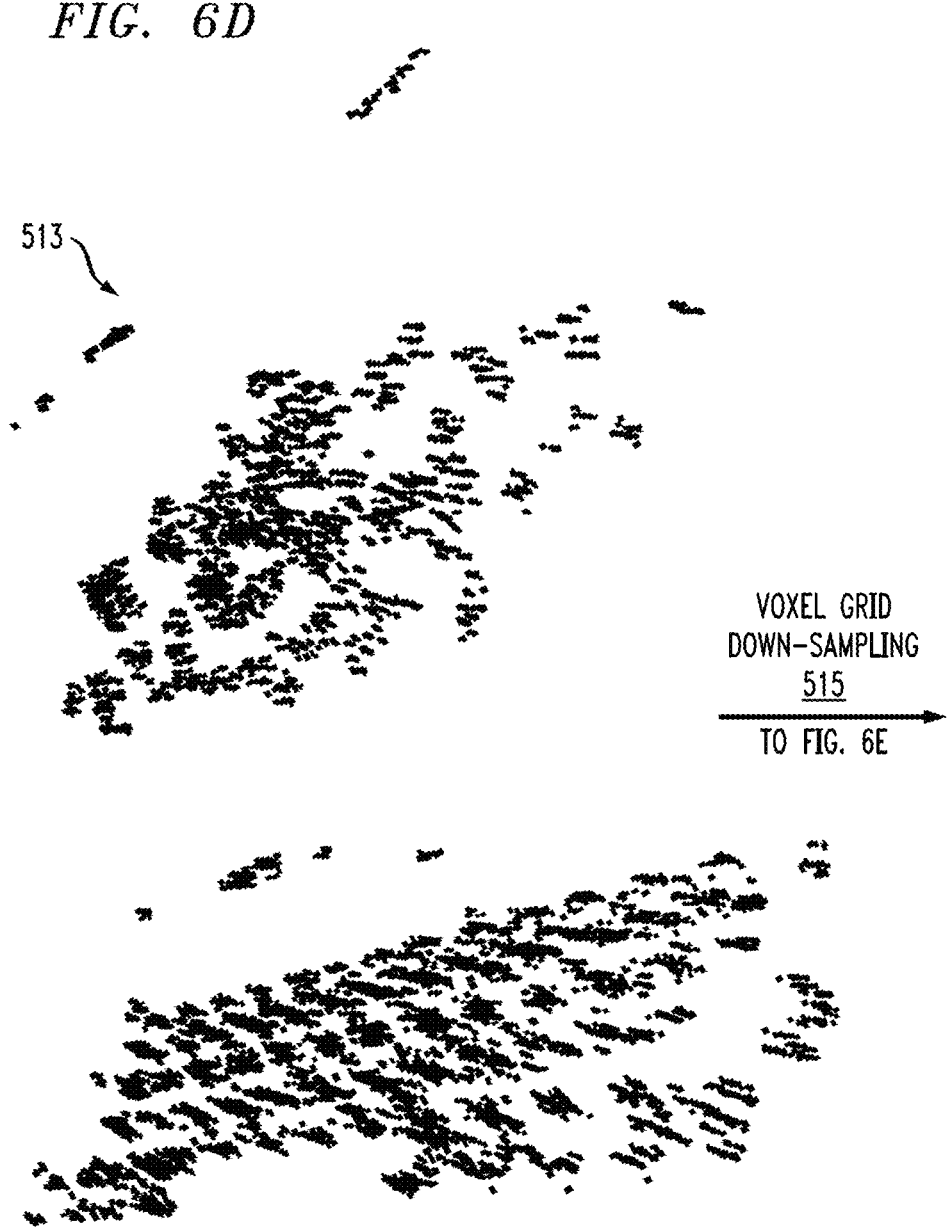
Figure 6E:
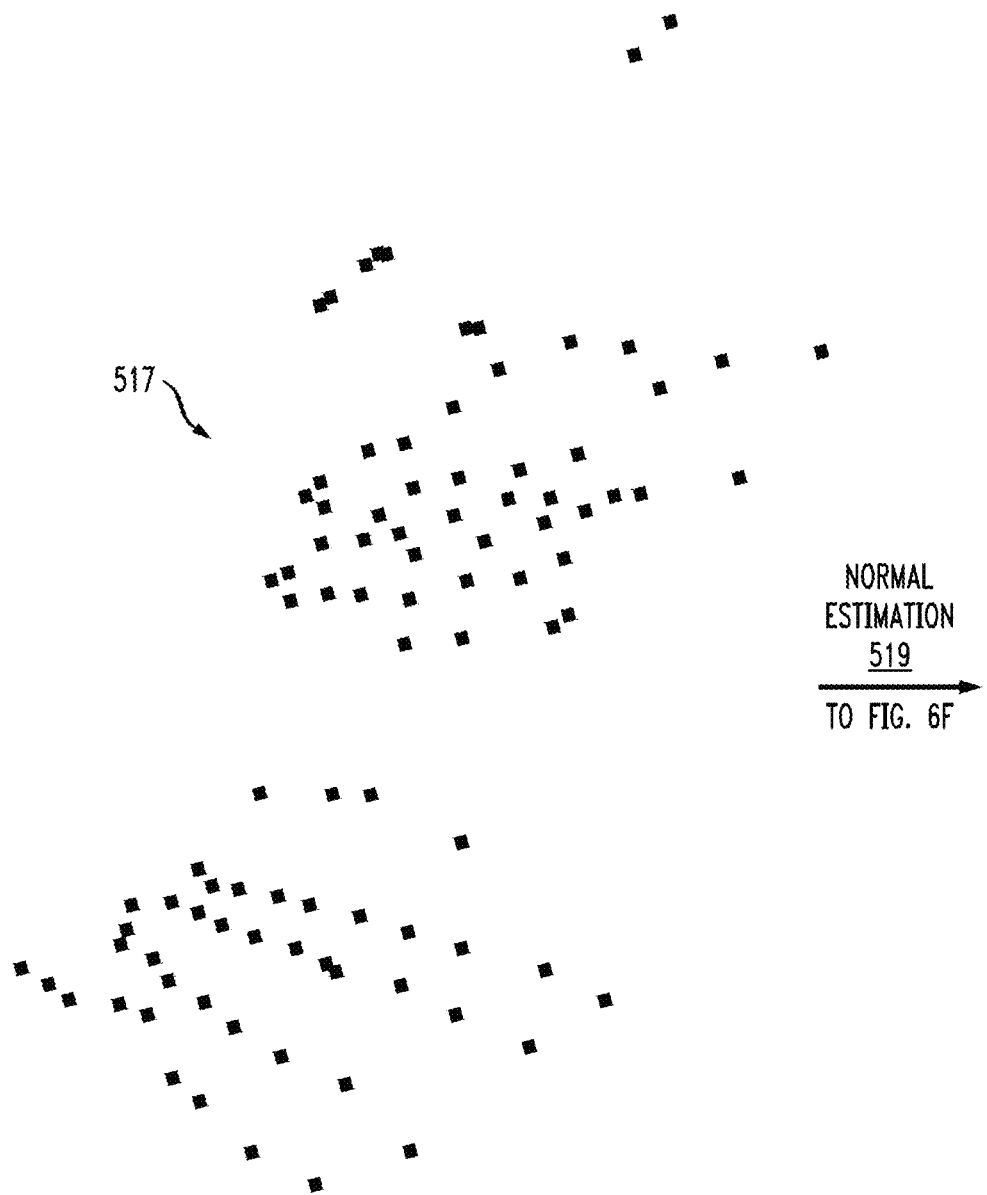
Figure 6H:
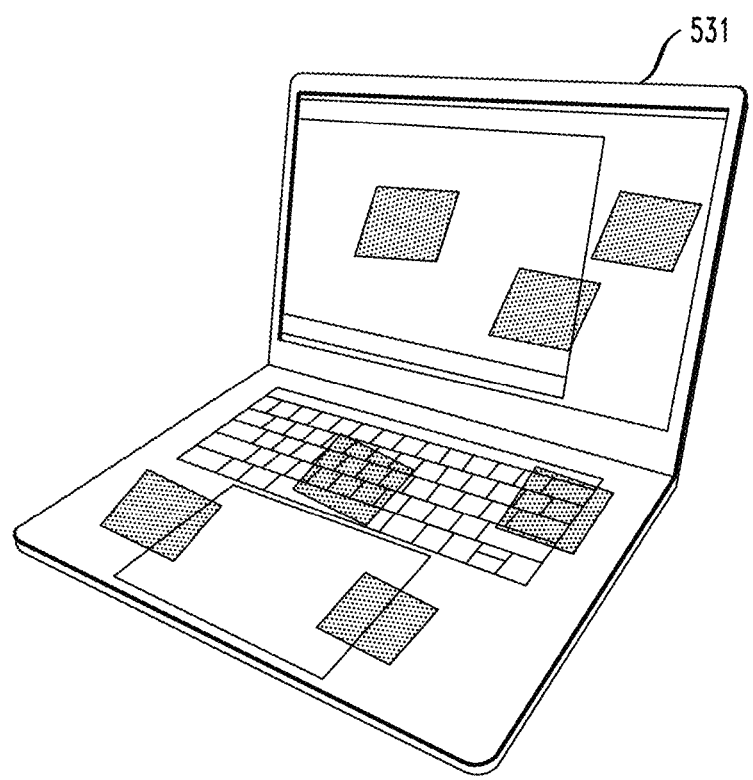

FIG. 5 shows an alternative view, discussed elsewhere herein.

FIG. 6 shows an exemplary process for ROI generation. First, at 503, scan the object of interest (here, a laptop computer) 502 with an AR development platform; one non-limiting example is Apple's ARKit augmented reality development platform for iOS mobile devices; another is Google's ARCore software development toolkit (the skilled artisan is familiar with the ARKit platform, ARCore toolkit, and the like). As seen at 505, this results in an accumulated point cloud of feature points; in essence, a rough representation of the object. Then, at 507, detect the outliers, which are depicted in red in view 509. At 511, remove the outliers to obtain view 513, a point cloud representation of the object 502. At 515, carry out voxel grid down-sampling to obtain view 517, wherein each point is a centroid of a small voxel of the 3-D space. In essence, down-sample to a certain size. Then, at 519, estimate the normals of the voxels to obtain view 521. At 523, process view 521 to obtain candidate regions of interest 525-1, 525-2, 525-3, 525-4, 525-5, 525-6, and 525-7. Only seven are shown to avoid clutter; however, in general, regions of interest are generated to cover the entire surface of the object 502. There is typically an ROI for each dot with a protruding normal; only seven ROIs are shown to avoid clutter. At 529, project the candidate ROIs onto the 2-D image to obtain view 531.

One or more embodiments leverage the camera pose tracking in AR to keep the camera focusing on Regions of Interest (ROIs), such that noisy background information can be filtered out; the result is robust against arbitrary device movements.

Figure 7:
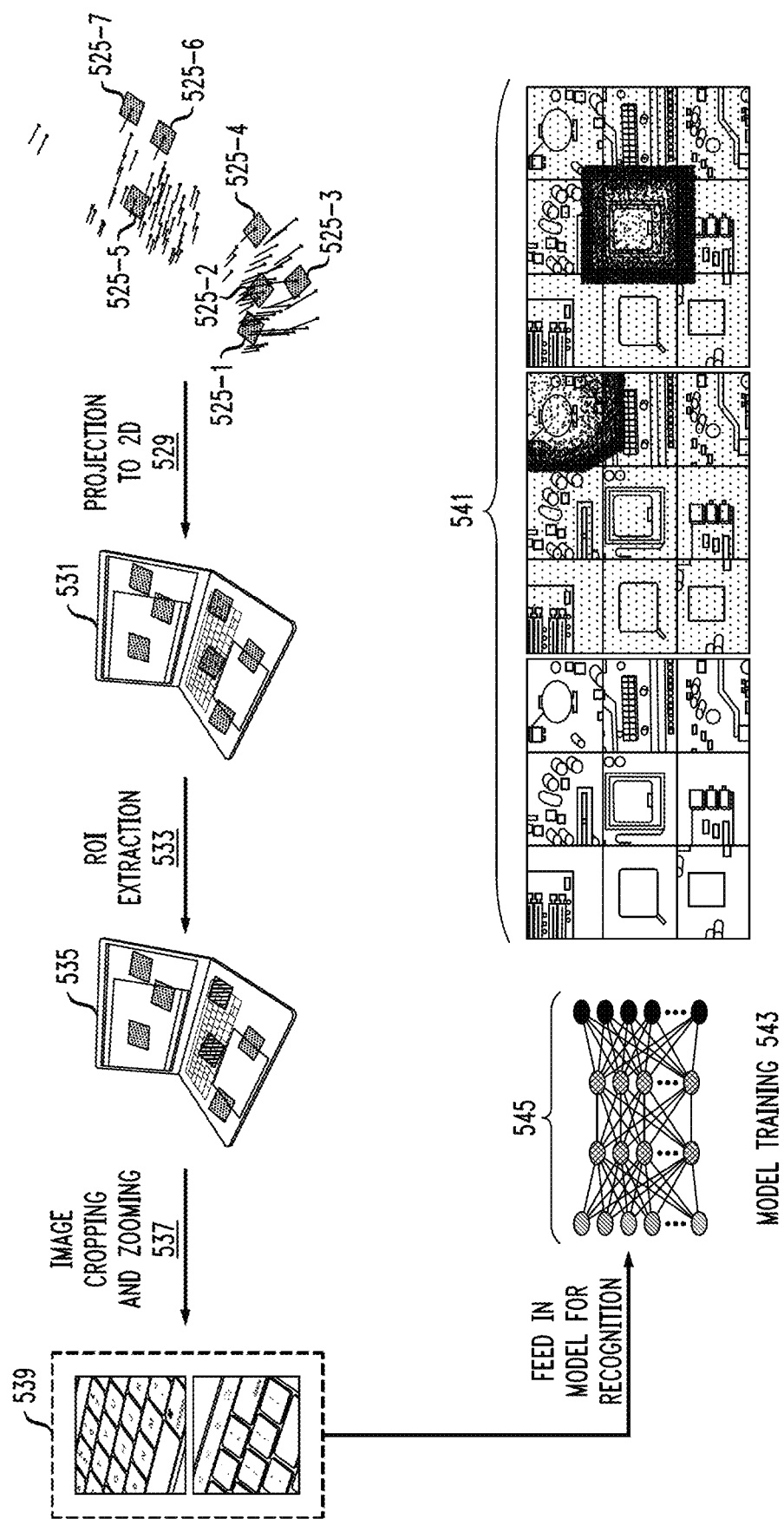
FIG. 7 shows an exemplary process for region of interest (ROI) selection, according to an embodiment of the invention.

Referring now to FIG. 7, identify those ROIs that are most distinguishable between different object states. Focus on those (distinguishable) ROIs and exclude the ROIs that are noisier (i.e., those that contain background). The regions of interest are represented by 3-D coordinates, which are projected onto 2-D images. At 533, carry out ROI extraction to obtain view 535 with two ROIs. Then, at 537, carry out image cropping and zooming to obtain cropped and zoomed images 539 (small regions of interest); images are typically obtained for each ROI for each state of interest. Concatenate the cropped images as seen at 541 in the lower right-hand corner of FIG. 7. As seen at 543, train a model 545 to classify such images. During the training process, for each state change, it is typically possible to determine which ROIs have the most significant impact. For example, if it is desired to detect whether or not the battery has been removed, the user is guided to focus on the battery ROI to resolve any confusion about the actual state. In this context, in one or more embodiments, the ROIs refer to all the ROIs that have significant impact. Besides, it is also known which ROIs have visual changes from one state to another. For example, one or more instances have four states: battery, battery off, cpu on, cpu off, and two ROIs (battery and cpu). If the system is ambiguous about battery on/off, then this ROI should be scanned, instead of the cpu. Each ROI is associated to a certain state change; in one or more embodiments, that is how the users are guided to move the camera when uncertainty happens. The probability of each state indicates which state is desired to be detected. For example, if the state/probability is state 0: 0.05, state 1: 0.45, state 2: 0.5, that means the system is confused by state 1 and 2. The corresponding ROIs should be scanned.

Figure 8:
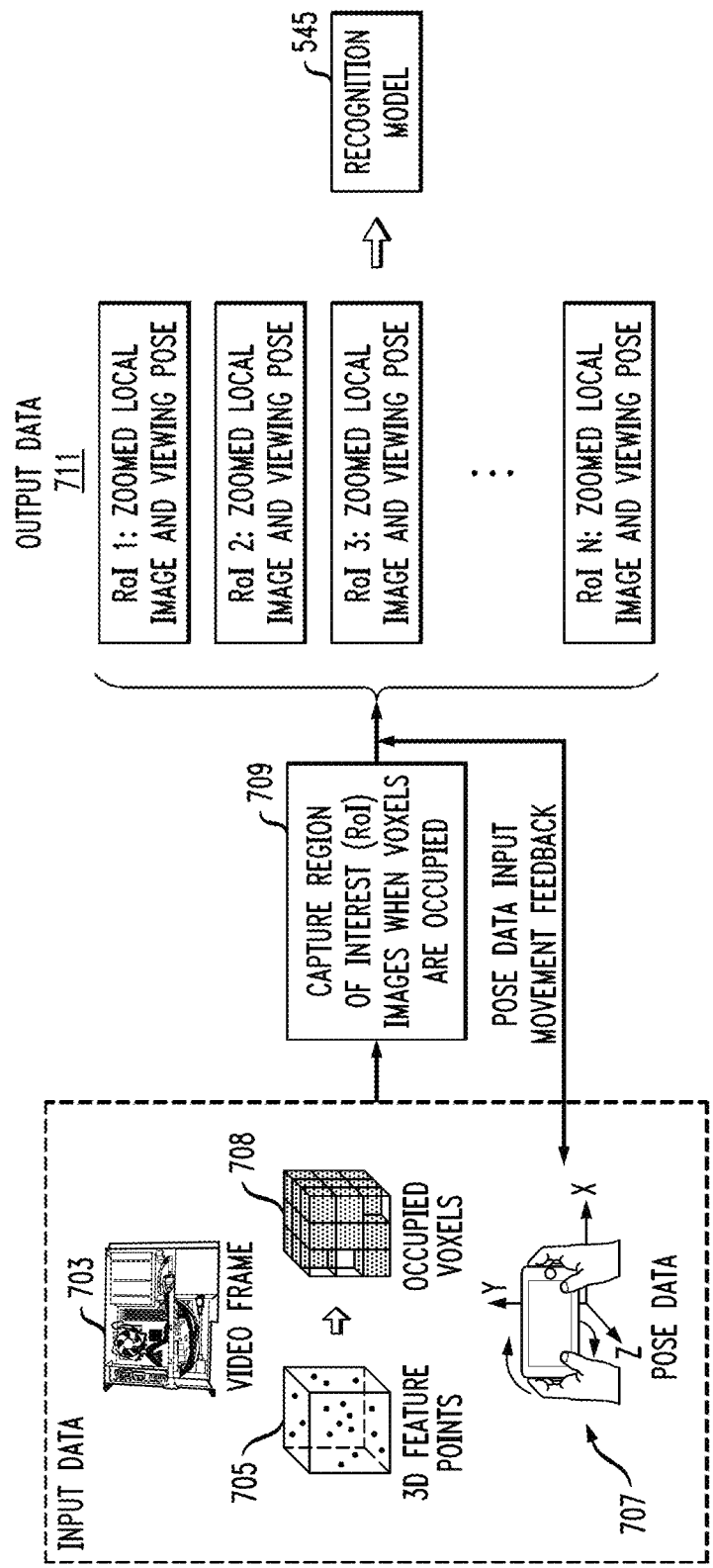
FIG. 8 is a combined data flow/block diagram with runtime details, according to an embodiment of the invention.

Referring now to FIG. 8, in one or more embodiments, at run time, take as input video frames 703; 3-D feature points 705; and camera pose data 707 (camera orientation and location) as input, and based on the ROI, as at 709, carry out a 3-D to 2-D projection, and obtain images for each ROI and concatenate them together for recognition. Referring also to 708, one or more embodiments only capture ROI images when voxels are occupied. As seen at 711, obtain, for each ROI, a zoomed local image and viewing pose, which can be concatenated to obtain recognition model 545. This technique advantageously permits obtaining very fine-grained images with high accuracy. This is due to the use of high-resolution images and the cropping to consider only ROIs with changes. One or more embodiments are robust to camera movements and automatically ignore occluded and/or blurred (e.g. due to too-fast camera translation and/or rotation) images.

Thus, one or more embodiments leverage camera pose tracking and 3-D feature points, which are "byproducts" of AR. Advantageously, one or more embodiments are able to detect very fine-grained changes with high accuracy as very detailed sub-areas are captured. Such areas are zoomed in and cropped out during scanning. One or more embodiments are robust against occlusions from the user's hand, tools, etc. as 2-D images are only captured when the voxels of interest are occupied. One or more embodiments are robust to camera movements and ignore blurred images automatically.

Figure 9:
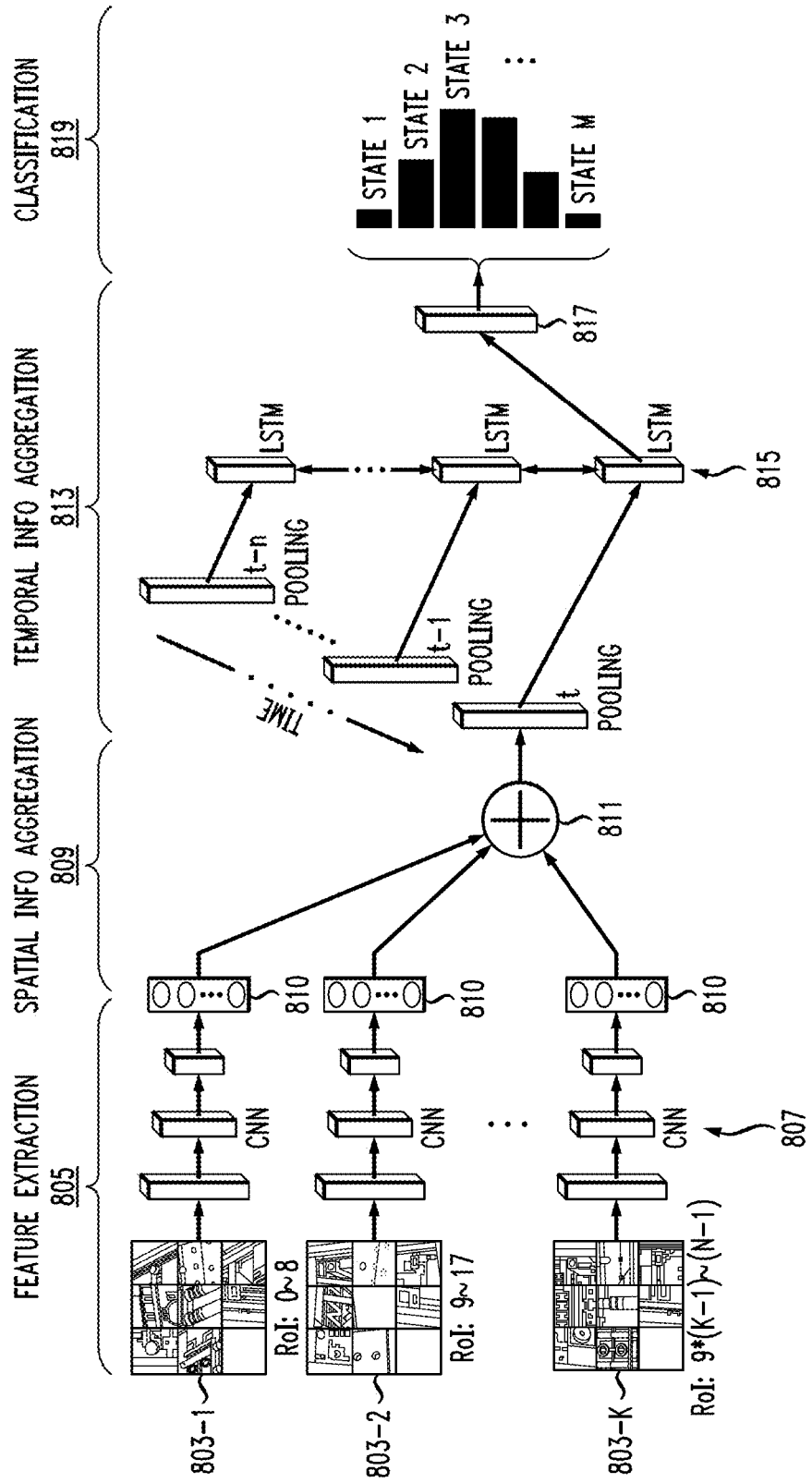
FIG. 9 is an exemplary model design, according to an embodiment of the invention.

FIG. 9 shows aspects of model design. Multiple branches 803-1, 803-2, . . . , 803-K are provided for feature extraction. These are obtained by separating the ROIs into multiple branches; for example, 803-1 includes ROIs zero through eight; 803-2 includes ROIs nine through seventeen; and 803-K includes ROIs 9*(K−1) through N−1 (N=total number of ROIs, numbered 0 through N−1, and K=number of branches). In some instances, there might be less than eight ROIs and only a single branch 803-1 might be employed, for example. Putting too many ROIs into a single image will undesirably compress the resolution, because the input to the CNN is fixed. Thus, the ROIs are typically distributed into multiple branches; this advantageously saves computational overhead, because updating one ROI image only requires running one branch of feature extraction. Thus, the feature extraction process is shown generally at 805, and it makes use of convolutional neural network(s) 807. At 809, carry out spatial information aggregation by concatenating all the extracted features 810, as seen at 811. At 813, carry out temporal information aggregation: for each time step t–n, . . . , t–1, t, the spatial information is pooled. In one or more embodiments, a long short-term memory (LSTM) layer 815 is used, eventually leading to a fully connected layer 817 for classification 819. The distribution of the ROIs into multiple branches, such that each ROI has adequate resolution, is advantageous in one or more embodiments.

One or more embodiments provide a method of fusing 2-D video frames and 3-D point clouds in AR for fine-grained visual recognition, which is robust against random camera movements and occlusions. One or more embodiments generate ROI candidates from accumulated sparse 3-D feature points collected from AR sessions, and extract the most distinguishable ROIs using Gradient-weighted Class Activation Mapping (Grad-CAM). One or more instances leverage the accurate camera pose tracking for ROI tracking and cropping, such that the recognition model can focus on ROIs no matter how the camera moves (some embodiments carry out ROI cropping automatically, based on camera location). This is more efficient and robust compared to region proposal networks. One or more embodiments employ a multi-stream CNN with bi-directional LSTM with an attention mechanism neural network that takes sequences of ROIs and camera poses as input, and extracts the spatial and temporal information for robust visual recognition.

One or more embodiments are able to detect very fine-grained changes with high accuracy as very detailed sub-areas are captured. Such areas are zoomed in and cropped out during scanning. One or more embodiments are robust against occlusions from the user's hand or other tools as 2-D images are captured only when the voxels of interest are occupied. One or more instances are robust to camera movements and ignore blurred images automatically.

One or more embodiments identify ROIs automatically, by learning from the data, and take as input not only images and poses, but also 3-D feature points. In one or more embodiments, multiple ROIs are captured concurrently, and ROIs from images are tracked and cropped automatically using camera pose and projection. One or more embodiments employ a multi-stream CNN-LSTM with distributed ROI concatenated images as the underlying deep learning model.

One or more embodiments provide a method for generating augmented reality driven repair guidance including scanning an object of interest using a mobile device; extracting camera pose and frame information from the scan; extracting a frame showing regions of interest which define visually changing aspects of objects; cropping frames showing regions of interest to only contain relevant portions; and automatically detecting occlusion of targeted regions of interest to activate the deep learning model only when there are actual changes. Further steps include feeding cropped frames to a deep learning model to detect visual changes in the state of the object; using the detected object state to determine what instruction(s) to render through AR; and guiding the user to the relevant ROI based on real-time prediction results.

In some cases, extracting frames showing regions of interest is performed automatically by training a CNN-based deep learning model, which includes: region of interest candidate generation; and selecting the most pertinent regions of interest. In some such cases, cropping frames showing regions of interest to contain only relevant portions to increase visual recognition accuracy includes: cropping and concatenating the regions of interest from image frames; and data augmentation of individual region of interest images and concatenating them. In some such cases, cropped frames are fed to a deep learning model to detect the visual changes in the state of the object; a multi-stream CNN-LSTM model takes distributed concatenated images as input for inference.

The skilled artisan will thus appreciate that visual recognition in AR can play an important role to realize the true value of AR-assisted repair. One or more embodiments provide an approach for fine-grained active visual recognition in augmented reality, which is capable of recognizing very fine-grained details of a complex 3-D object, such as a screw removed from a machine. One non-limiting exemplary implementation employs an iOS-based mobile app, and can be used for hardware maintenance.

Leveraging AR tracking for visual recognition is quite pertinent in one or more embodiments. One or more instances provide a frame-filtering algorithm with pose clustering and inertial sensor-based best frame selection. Embodiments can be used in many different applications; e.g., AR-assisted repair work (vehicles, electronics, self-assembled furniture, and the like); education (handicraft making, and the like); entertainment; gaming; and so on.

One or more embodiments are not limited to classifying object categories, but rather are capable of classifying fine-grained states. One or more embodiments are capable of handling 3-D objects and not merely 2-D images. One or more embodiments work successfully with cameras commonly found on mobile devices such as phones, tablets, and the like. One or more embodiments recognize 3-D objects in video frames, leveraging the camera pose from AR.

Augmented Reality is increasingly explored as a new medium for two-way remote collaboration applications to guide participants more effectively and efficiently via visual instructions. Users are striving for more natural interaction and automation in augmented reality applications. One or more embodiments provide new visual recognition techniques to enhance the user experience. Although simple object recognition is often used in augmented reality towards this goal, most collaboration tasks are too complex for such recognition algorithms to suffice. One or more embodiments provide an active and fine-grained visual recognition approach for mobile augmented reality, which leverages 2-D video frames, 3-D feature points, and camera pose data to detect various states of an object. One non-limiting exemplary application is a mobile application for hardware support, which automatically detects the state of object for which support is sought to present the right set of information in the right context. One or more embodiments advantageously overcome limitations of prior-art techniques, which require all interaction to be driven by the user due to lack of semantic, fine-grained recognition.

Figure 3D:
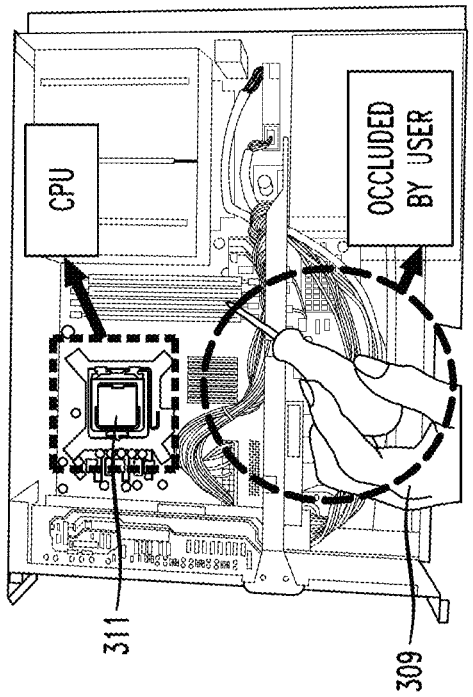
Figure 3A:
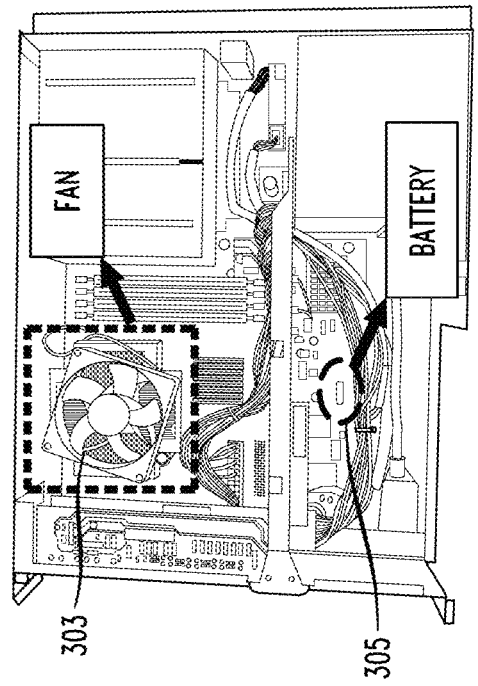
Figure 3C:
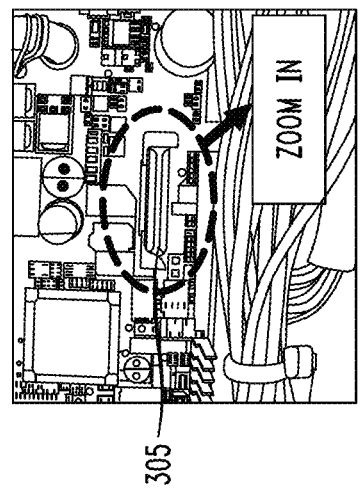

One or more embodiments provide enriched AR user experiences, more fine-grained visual recognition, i.e., recognizing not only objects but also parts of or state change of an object, usable in a wide range of application scenarios, including technical support. One or more embodiments advantageously overcome various challenges in providing such fine-grained visual recognition capabilities. For example, referring back to the example of FIGS. 3A-3D, a technician is replacing the CPU 311 of this computer. To render the relevant AR instructions in the right context, the visual recognition mechanism should be able to detect the state change of a part of this computer—the motherboard, for example. Only when both the battery 305 and the fan 303 are removed from the motherboard, should the AR instructions for CPU removal be rendered. Compared to traditional visual recognition methods, implementing such state recognition requires addressing the following challenges in an AR application:

i) Camera Distance:

Depending on the target object or object parts that need to be recognized, the machine learning model typically requires the camera to be at a varying distance to the object. For example, in FIG. 3A, in order to recognize the whole machine in the camera field of view (FoV), the camera needs to be far away from the machine, while to recognize the battery, the camera needs to be closer to the machine. This requires adjusting camera distance dynamically to achieve fine-grained visual recognition.

ii) Viewing Angle:

The relevant target object parts should be visible to be recognized. This means that the camera should capture the object at a certain angle. FIG. 3B shows the machine being viewed from a particular angle where the battery is occluded by wires, whereas in FIG. 3C the battery is clearly visible. Unless a proper viewing angle is maintained, visual recognition naturally results in poor accuracy.

iii) Noisy Input:

As shown in FIG. 3D, a common challenge in AR-driven hardware support is that the object may be temporally occluded by the users' hand or tools. It is also common that the input images are captured by a moving camera; hence, they can be blurry at times. All these factors make input images noisy for the visual recognition model. One or more embodiments, advantageously, are robust in dealing with such noisy input, while providing reliable and stable recognition results. In addition to these challenges, one or more embodiments are designed to work within the resource and power constraints of mobile devices.

One or more embodiments enable a machine to mimic the process of human perception and reasoning: to detect state changes, embodiments enable the camera to focus on discrete local areas that change appearance in different states; prompt the user to adjust to proper viewing angles to collect images from these local areas, and make prediction(s) on state change only when sufficient visual data is collected.

One or more embodiments take advantage of AR-specific data, such as real-time generated 3-D feature points and camera pose(s), to complement the images captured by the camera for fine-grained visual recognition. One or more embodiments first use a set of training videos and learn Regions of Interest (ROIs), which have appearance changes that distinguish different states. One or more embodiments actively track the 6-DOF (six degree of freedom: x, y, z translation plus pitch, yaw, and roll) camera pose to ensure that the camera is kept at the right distance and viewing angle to the ROIs, and to minimize occlusions or other noise to the input images of the visual recognition model. To improve the robustness of recognition, one or more embodiments provide a discrete multi-stream Convolutional Neural Network (CNN), in conjunction with bi-directional Long Short Term Memory (LSTM), namely a Discrete-CNN-LSTM (DCL) model, to extract not only spatial, but also temporal data to predict state changes. One or more embodiments:

Address the unique problem of fine-grained visual recognition in a mobile AR setting, and combine image, 3-D feature point and camera pose data to actively predict object state changes.

Generate ROI candidates from merged 3-D feature points collected from AR sessions, and extract distinguishable ROIs automatically using deep CNN feature representations, which are tracked and cropped for fine-grained recognition.

Provide a Discrete-CNN-LSTM (DCL) model, with distributes ROI images on discrete multi-stream CNN branches and aggregates information with bi-directional LSTM layers. Multi-stream CNN with shared weights solves the contradictory problem between high image resolution required for fine-granularity thus larger model size, and the shrinking resolution as the number of ROIs increase. The LSTM layers aggregate the visual information in the temporal domain to further enhance the prediction stability.

Provide a mobile (e.g. iOS) application using a toolkit such as ARKit and a large-scale machine learning system such as TensorFlow, useful, for example, in the hardware maintenance application scenario.

The acronym AFVR is used herein to refer to Active Fine-Grained Visual Recognition. It is worthwhile to consider basic AR concepts relevant to one or more embodiments.

Object Model.

An object model is a point cloud, or a collection of 3-D feature points that represent a physical object. It is constructed from images taken from different angles with the object in view. During an AR session, the object model is used by the mobile device to re-localize itself, i.e., understand its relative position and orientation with respect to the physical object. Device re-localization is quite pertinent in one or more embodiments because it determines where AR content is projected with respect to the object. One or more embodiments use the object model not only for re-localization, but also to determine the ROIs.

Camera Pose.

Camera pose refers to the position and the orientation of a mobile device in 3-D space. AR software development kits (SDKs), such as ARKit and ARCore, leverage visual-inertial odometry to track camera pose using motion sensing combined with computer vision analysis of the scene. Camera pose is represented as a 4×4 matrix M, which describes the rotation, scale and transition of the device coordinates.

Feature Points.

Feature points represent notable features detected on images. Feature points collected from different viewing angles form the object model or point cloud, which is used for AR tracking. Feature points at each frame are represented as $P=\{p_0, p_1, \ldots, p_N\}$, where $p_i=\{x_i, y_i, z_i\}$ is the location of a point i in 3-D space, and N is the total number of points.

In one or more embodiments, an initial step of AFVR is to identify Regions of Interest (ROIs) that represent the object state change. Then, leverage the camera pose tracked in AR to keep the camera focused on ROIs so that adequate video frames are captured for state recognition. Finally, filter out noise in the frames to improve robustness of the recognition. FIG. 5 illustrates design of an exemplary system, which includes both off-line and on-line components.

In the off-line phase 403, first harvest data from the AR remote sessions via crowdsourcing 599, or (as at 597) have a dedicated user to scan the object with a mobile device to construct the relevant object models (as at 595)—3-D point cloud representations of the object in different states. Also collect the camera poses, the corresponding feature points and video frames. Next, the ROI extraction step 593 generates a set of ROIs, based on video frames collected in different states. These ROIs will determine what images should be generated from video frames to recognize object states.

In the on-line phase 405, AFVR first detects the object and re-localizes the mobile device with respect to the object at 591, using the object model. The ROIs 589 identified in the off-line phase are also be mapped to the object, as described elsewhere herein. Next, crop the images of these ROIs to keep only the relevant areas of the ROIs 587, and further process them to train the model for state recognition as at 585. During real-time recognition 583, the mobile app instructs the user (at 581) to position the camera at the right distance and viewing angle to the object, and applies the trained visual recognition model to predict the current state. Based on the predicted state, the applicable object model is automatically selected for AR tracking, and the corresponding AR instructions are rendered accordingly.

Figure 10:
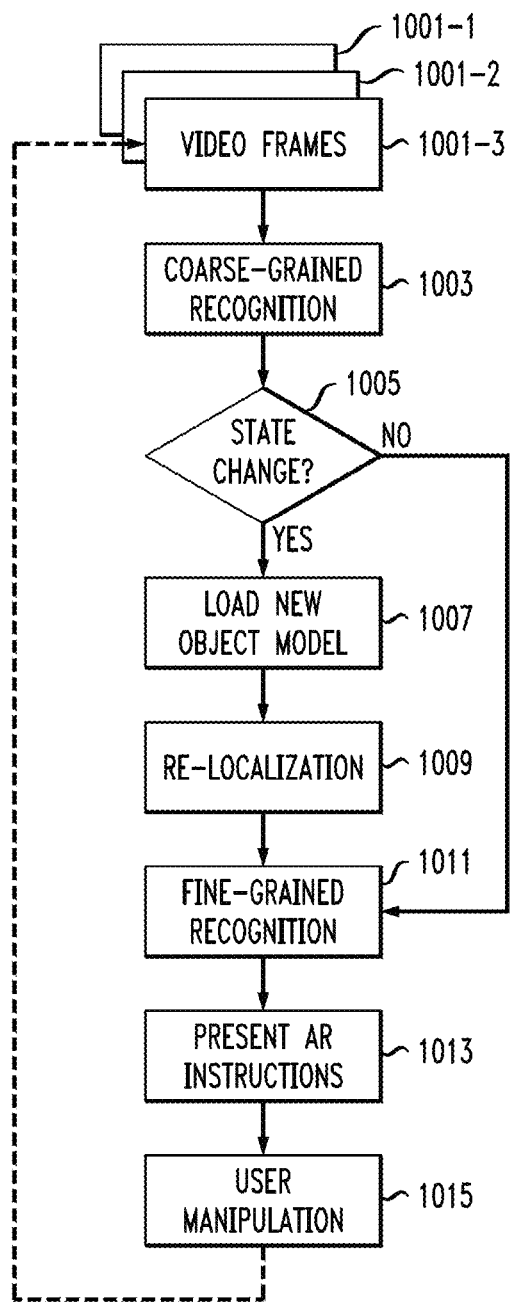
FIG. 10 is a flow chart showing pose-independent coarse-grained recognition selecting the correct object model for re-localization, according to an embodiment of the invention.

Refer also to FIG. 10 which shows how pose-independent coarse-grained recognition selects the correct object model for re-localization, which enables fine-grained recognition. Carry out coarse-grained recognition 1003 on a plurality of video frames (e.g. 1001-1, 1001-2, 1001-3; any appropriate number of frames can be used). In decision block 1005, determine whether there has been a state change. If not (NO branch), proceed to fine-grained recognition 1011, present the AR instructions to the user at 1013, and the user manipulates the device at 1015 while additional frames are captured. On the other hand, if there has bene a state change (YES branch of decision block 1005), load a new object model at 1007, re-localize the device at 1009, and then continue with fine-grained recognition 1011.

Object Model Construction:

To construct an object model, scan the physical object using ARKit's (or similar) scanner functionality and extract feature points to create the 3-D point cloud. The feature points extracted from video frames are accumulated during the course of scanning from different viewing angles. Note that there is a trade-off between the accuracy and computational overhead of AR tracking, determined by the density of feature points in the point cloud. In one or more embodiments, leverage relatively sparse AR tracking, and denser point clouds for ROI identification, as described elsewhere herein.

In one or more embodiments, construct separate sparse and dense point clouds for physical objects in different states. This can be accomplished, for example, if the user knows a priori the different states of an object, and performs a separate scan in each state. Point clouds representing different states can also be obtained implicitly from AR-driven remote assist sessions if the users explicitly mark the state change verbally or manually during the session. An exemplary inventive point cloud generation algorithm takes images corresponding to each implicit state as input, and generates the relevant point clouds.

In practice, the point clouds generated may have a lot of noisy feature points due to, for example, depth estimation inaccuracy. One or more embodiments further filter the feature points by removing the 'non-smooth' outliers from the neighborhood of each feature point. Specifically, for each point $p_i$, compute its mean distance to all its k nearest neighbor points $q_j (j=1, 2, \ldots, k)$ as:

$$\bar{d}_i = 1/k \cdot \sum_{j=1}^{k} \text{dist}(p_i, q_j)$$

and the standard deviation as $$\sigma = \sqrt{\frac{1}{k-1} \sum_{j=1}^{k} (d_j - \bar{d}_i)^2}$$

where $\text{dist}(p_i, q_j)$ is the Euclidean distance between point $p_i$ and $q_j$. Assuming the distribution of distance to neighbors is Gaussian: $\mathcal{N}(\bar{d}_i, \sigma^2)$, all the points with distances $d > \mu + \alpha \cdot \sigma$ are considered outliers, thus removed. Here $\alpha$ is a parameter that controls the "smoothness" of the point cloud surface. In one or more embodiments, set k=50 and $\alpha$=1.0. As shown in FIG. 6, first detect s, marked in red at 509, then derive the clean point cloud 513.

After this step, obtain the point clouds that robustly represent the object in different states. For each state, a dense point cloud with more feature points is generated for ROI identification, while a down-sampled, sparse point cloud is created for efficient tracking. The point clouds generated in different states can be easily aligned in the same 3-D coordinate system since they use the same sparse point cloud for re-localization. ARKit re-localization has a certain tolerance to appearance or shape changes; thus, re-localization works well as long as object changes are partial or minor.

ROI Identification:

ROI is a segment in the 3-D space where an object's physical appearance changes due to the state change. To visually recognize the changes in an ROI, project the ROI to a region in the 2-D image taken from a certain viewing angle of the object. The simplest way to identify an ROI is to rely on human knowledge: an expert user can draw the boundaries of ROIs on given images. This is tedious in practice, and can easily lead to inconsistency in ROI or state definitions due to different human interpretations. Hence, one or more embodiments provide an approach to automatically identify the ROIs, given a set of images and point clouds labeled with different states, as discussed elsewhere herein.

Voxelization:

In one or more embodiments, segment the 3-D space into voxels of a fixed size. An ROI includes one or multiple voxels, which may contain some (or no) feature points. To identify the ROIs, a consistent way to project voxels onto 2-D images is appropriate. For that purpose, define the anchor point for a voxel to be the centroid of all features points contained in this voxel. When projecting the voxel, this anchor point is first projected to the 2-D image. Centered around this anchor, a square area with width w is cropped out of the image to represent the corresponding voxel. This ensures that the projected image contains sufficient visual details of the object surface. View 517 shows the anchor points for all voxels of a sample object.

To ensure that sufficient visual details are collected for a voxel, ensure that the object appears in the camera's field of view. This is enabled by estimating the normal of the anchor point, with respect to the object surface. Estimate the normal vector at the anchor point by calculating the normal of the plane tangent to the object surface at the anchor point. This can be achieved by least-square plane fitting, using libraries such as point cloud library (pcl). Examples of the estimated normal vectors are shown in view 521.

ROI Image Selection:

Given camera-captured images of an object, crop out the ROI candidate images that can serve as input for object state recognition. An ROI candidate image is a square segment cropped around the voxel anchor at {x, y, z} with width w. Project the voxel anchor and all vertices of an ROI candidate to the camera-captured image, and choose the minimum-bounding rectangle that covers the projected ROI as the cropping area. Given the camera pose (represented as a transformation matrix $M_{camera}$) and the coordinates of a point in 3-D space $P_{world}$, project this point to be in camera coordinates with:

$$P_{camera} = P_{world} \cdot M_{camera} \qquad (1)$$

where $P_{camera}$ is the projected point in camera coordinates. Use perspective projection to project the point in camera coordinates to the image plane by a simple division of the point's x and y coordinate by the z coordinate:

$$P' \cdot x = \frac{P_{camera} \cdot x}{-P_{camera} \cdot z} \qquad (2)$$

$$P' \cdot y = \frac{P_{camera} \cdot y}{-P_{camera} \cdot z}$$

Then, convert the 2-D point in image space to raster space, which is represented as pixel coordinates:

$$visible = \begin{cases} yes & |P' \cdot x| \leq \frac{W}{2} \text{ or } |P' \cdot y| \leq \frac{H}{2} \\ no & otherwise \end{cases} \qquad (3)$$

$$P'_{norm} \cdot x = \frac{P' \cdot x + width/2}{width} \qquad (4)$$

$$P'_{norm} \cdot y = \frac{P' \cdot y + height/2}{height}$$

where W, H are the width and height of the canvas in raster space, and $P_{norm}' \cdot x$, $P_{norm}' \cdot y$ are normalized coordinates in raster space, which are further multiplied by the resolution of the image frame so that the pixel coordinates can be obtained. One ROI is within the FoV only when the four projected vertices are visible. The images for each visible ROI are cropped from the raw full resolution image frame and resized to a fixed resolution. Multiple ROIs can be cropped simultaneously, as long as they are within the FoV and visible to the camera in one single frame. A few samples of ROI candidate images are shown at 525-1 through 525-7 after the cropping steps have been applied.

Next, select from these ROI candidates the ones that can most differentiate the object states. One or more embodiments use Gradient-weighted Class Activation Mapping (Grad-CAM) to perform ROI image selection. For each state of the object, collected images are available from different viewing angles. Crop each image to obtain the ROI candidate images. According to location of the corresponding voxels, sort and concatenate the cropped images into single images and resize them to a fixed resolution (e.g., 224×224) as input data to Grad-CAM, as shown in the leftmost of the three images 541. For each state, a subset of these candidate images reflect the appearance change of the object.

Deeper representations in a Convolutional Neural Network (CNN) capture higher-lever visual features. State-specific information in the input image (i.e., from voxels with appearance change) are usually captured in the last few convolutional layers that have high-level semantic and spatial information. Grad-CAM uses the gradient information flowing into the last convolutional layer of the CNN to understand the importance of each candidate image (other methods such as SIFT and ORB could be used in other embodiments; however, in experiments we have found that these techniques are not as effective in identifying ROIs since they are searching for similarities, instead of identifying minor visual differences). A goal of ROI selection is to obtain a class-discriminate localization map $G^c \in \mathbb{R}^{u \times v}$ of width u and height v for any class c. For this purpose, compute the gradient of a class probability $y^c$ with respect to feature maps $A^k$ of a convolutional layer, i.e.

$$\frac{\partial y^c}{\partial A^k}.$$

So the weights $\alpha_k^c$ can be global-average-pooled as:

$$\alpha_k^c = \frac{1}{Z} \sum_i \sum_j \frac{\partial y^c}{\partial A_{ij}^k} \qquad (5)$$

where Z is the normalization factor and weight $\alpha_k^c$ captures the importance of the feature map A for a target class c. The Grad-CAM heat-map is a weighted combination of feature maps, which is followed by rectified linear units (ReLU):

$$G^c = ReLU\left(\sum_k \alpha_k^c A^k\right) \qquad (6)$$

This results in a coarse heat-map of the same size as the convolutional feature maps (7×7 in the case of last convolutional layers of ResNet50). Then, the heat-map is normalized to 0-1 and resized to the size of the input image, which is visualized by overlaying it on the input image, as shown at 541.

A pre-trained ResNet50 on ImageNet is employed in one or more embodiments as the back-bone model and is fine-tuned to classify the concatenated images from all the states, and then to generate the Grad-CAM maps. The Grad-CAM maps directly indicate the importance of each candidate image for distinguishing a specific state. The left-most of the images 541 shows the concatenated image of a subset of ROI candidate images, collected for a computer motherboard. In this example, the object has three states: default, battery removed, CPU removed. The cropped image indicating battery removed is in the upper right corner of the image concatenation, while that for CPU removed is at the center of the concatenation. The middle one of the images 541 shows the Grad-CAM heatmap overlaid on the image, which correctly indicates the two cropped images mentioned above are the best ROI images for differentiating these three states.

One or more embodiments build a super set of all the top 3 ROI candidates for each state selected from Grad-CAM and remove the duplicates. This new set of ROIs are used for final visual recognition model training and inferences during the on-line phase.

Visual Recognition Model:

With the concatenated ROI images as input, now develop CNN models to predict the class or state of an object. For simple scenarios, where an object only has a small number of ROIs (e.g., less than 6×6 concatenated ROI images), a light-weight, shallow CNN with max pooling and batch normalization is sufficient. As the application scenario becomes more complex, more ROIs are appropriate to cover all states. In such cases, naively concatenating all ROI images into a single input potentially causes problems: the resolution for each ROI reduces as the number of ROIs increases as the concatenated image resolution is fixed, which leads to loss of visual details. If the resolution of each ROI is maintained, the concatenated image resolution will quickly grow to be not suitable as input to the simple CNN model.

To deal with this challenge, one or more embodiments provide a discrete-CNN-LSTM model, which contains layers of discrete multi-branch visual feature extraction, followed by layers of spatial and temporal information aggregation for the final classification. FIG. 9 shows the architecture of the DCL model. The multi-branch CNN extracts spatial features from concatenated ROI images, which are aggregated by a pooling layer. An LSTM layer further aggregates the temporal information for stable prediction. Feature extraction 805 includes multiple feature extraction branches, each of which take concatenated ROI images (containing a maximum of nine ROIs) as input. One or more embodiments use a pre-trained ResNet50 on ImageNet as the base model for feature extraction, but remove the last fully connected layer of the model, thus obtaining a 2048-dimensional feature vector for each input image, which is then fed to a pooling layer. In one or more embodiments the ResNet50 inference only runs whenever there is an ROI image update for the concatenated input image. The image features extracted for other unchanged branches are reused. In this way, minimize the computation overhead on feature extraction, thereby significantly reducing the computation overhead and power consumption when the model is implemented on mobile devices.

One or more embodiments concatenate all extracted image features after the pooling layer into a single feature vector, which presents all pertinent visual information for state recognition. Instead of feeding this feature vector into a fully-connected deep neural network, one or more embodiments use LSTM to model the temporal relationship between states: the temporal sequence of the feature vectors is fed to the LSTM layer, which predicts the object state distribution. As discussed elsewhere herein, leveraging the temporal relationship between states significantly improves the prediction accuracy of the model.

Active Visual Recognition:

The visual recognition model can be trained offline, using the labeled data collected a priori. When building the mobile application to detect an object's state, implement the trained visual recognition model, and also consider two more design aspects: re-localization and ROI capturing.

Re-Localization:

Re-localization ensures the camera pose is tracked consistently across AR sessions, with respect to fixed object coordinates. This is pertinent for both capturing the correct ROIs and presenting AR annotations in the right positions relative to the object. One or more embodiments use the sparse point cloud obtained during object model creation for re-localization, leveraging the object tracking capability of ARKit. In a given AR application, there are two potential state change scenarios: 1) the state change involves a minor appearance change, hence the same sparse point cloud can be used for tracking; 2) the state change involves a major appearance change, so that a new point cloud needs to be loaded and the AR session re-localizes. One or more embodiments minimize re-localization to reduce the tracking inaccuracies that occur during AR sessions. For this purpose, adapt, for example, a ResNet50 model, which uses real time images taken from the object to determine the significance of state changes, and triggers re-localization only when it is necessary.

ROI Capturing:

One pertinent aspect involves capturing ROIs as image segments cropped from camera view. To capture the ROI images in a robust, online manner, one or more embodiments further address the following problems: occlusion detection, ROI image update, and device movement feedback.

Occlusion Detection.

Figure 11:
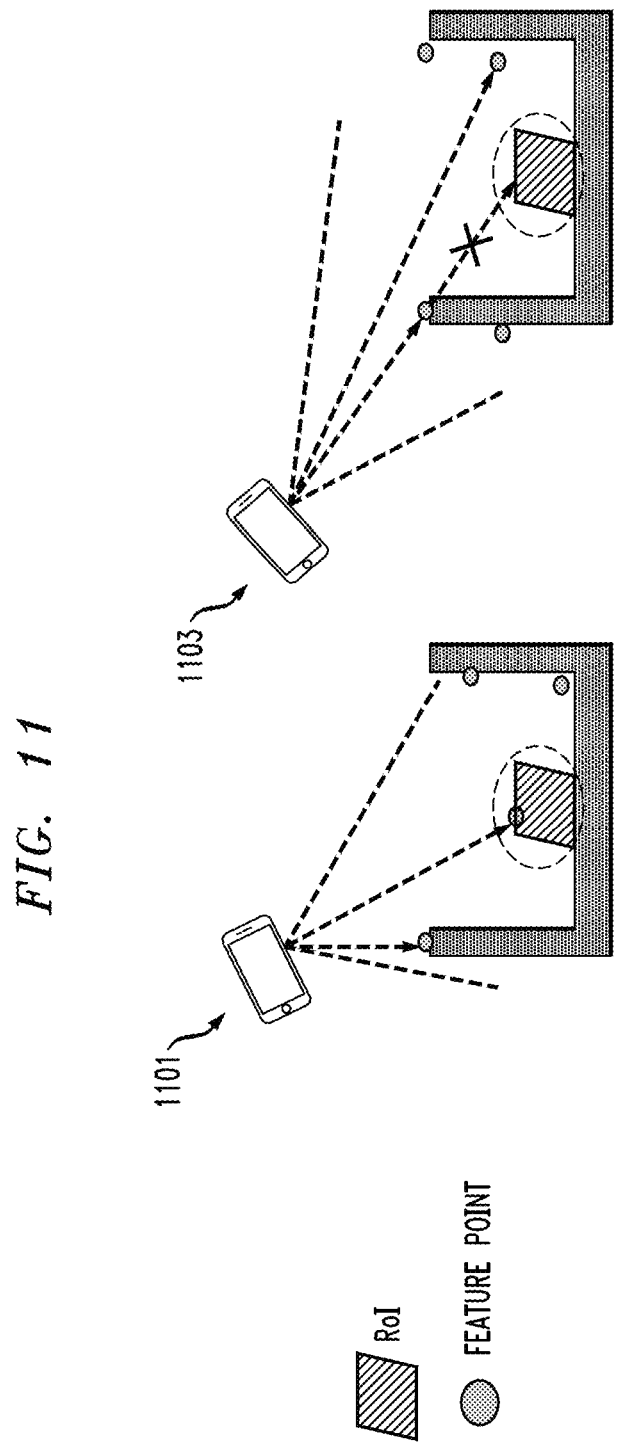
FIG. 11 shows an example of ROI occlusion, which can be effectively handled by embodiments of the invention.

An ROI can be only visible to the camera from certain viewing angles, or it can be occluded by other objects in the scene. FIG. 11 shows such an example. The camera pose 1101 yields valid capturing of the ROI, while for the camera in view 1103, the ROI is occluded from the camera's viewpoint.

A naive approach is to check if sufficient 3-D feature points for an ROI are detected on each frame, so as to determine if the ROI is occluded. However, due to computation overhead, feature points are typically not generated in real time for every frame. It is worth noting at this point that the skilled artisan will be familiar with the manner in which feature points are generated in ARKit: as the mobile device moves around, the device motion is updated at a high frequency to capture the minor displacement. The feature points are then triangulated to infer their 3-D positions, which are also used for calibrating the camera pose error by ARKit. Thus, there exists a delay between the feature points detected and the current frame. As the device is moving from "visible pose" to "invisible pose" (e.g., from the pose 1101 to 1103, the features detected in 1101 also exist in 1103 for a short time. To account for this latency, examine the past consecutive five frames as well as the feature points detected in the corresponding time period, to determine whether the ROI is occluded.

To determine occlusion for a certain ROI, the following three conditions should be satisfied: i) Within the camera FoV: The projected ROI should be within the current video frame, so that it is ready to be updated. ii) No sufficient feature points detected: Sufficient feature points must be detected for ROI capturing. If no sufficient feature points (e.g., >10) are detected for a short period of three seconds, it indicates occlusion is happening. One or more embodiments use the accumulated feature points for a short period to avoid false positives, because the feature points may be too sparse even when the ROI is not occluded. iii) Sufficient device movement: Because feature points rely on triangulation, which requires device movement, the feature points of a frame will remain unchanged or no feature points are generated if the mobile device remains stationary. Without sufficient feature points, it is typically not possible to tell whether the ROI is occluded.

ROI Image Update.

When predicting object state online (i.e., while using the AR application), the visual recognition employs input images from all ROIs, except for those that have not changed visually. Meanwhile, as the camera moves around an object, not all ROIs are visible to the camera, either because some ROIs are outside the camera's FoV or because they are occluded. The occlusion has two types: permanent occlusion, which means an ROI is occluded by other object components permanently in an object state (e.g., a fan covers a CPU); and transient occlusion, which is caused by inappropriate viewing angle or temporarily occluded by other objects such as user's hand. For a specific ROI, if it is continually detected as occluded for a long time (one or more embodiments set an empirical 5 s but other embodiments could differ) when the device is actively moved by the user while the ROI is within the FOV, classify the occlusion as permanent. In such cases, the image for this ROI is reset to zeroes for consistency (the state of "Fan is ON" in FIG. 3A can either happen before or after the CPU is captured, depending whether the machine is being assembled or disassembled). Similarly, when a component is removed, reset the associated ROIs. This is detected if such ROIs are within the FOV, but not detected for a period when they are not occluded.

If transient occlusion is detected or invisible ROIs are outside the FoV, assume there is no change visually. Therefore, during model prediction, the corresponding feature extraction branches in FIG. 9 will not be activated, but will reuse the previously extracted vectors, minimizing the unnecessary computations on the mobile device to prevent device heating. Usually it is natural for the user to view the object changes through the camera where AR annotations are displayed; thus, such changes are captured passively. In rare cases, it is possible that the user has disassembled a part of the hardware which altered its visual state, but if it is occluded or outside of the FoV, this will not be considered a state change and therefore the next set of instructions will not be provided to the user. Thus, an exemplary app encourages users to move the camera so as to view the altered object parts such that the ROIs can be efficiently updated, enabling responsive and accurate recognition results.

Figure 12:
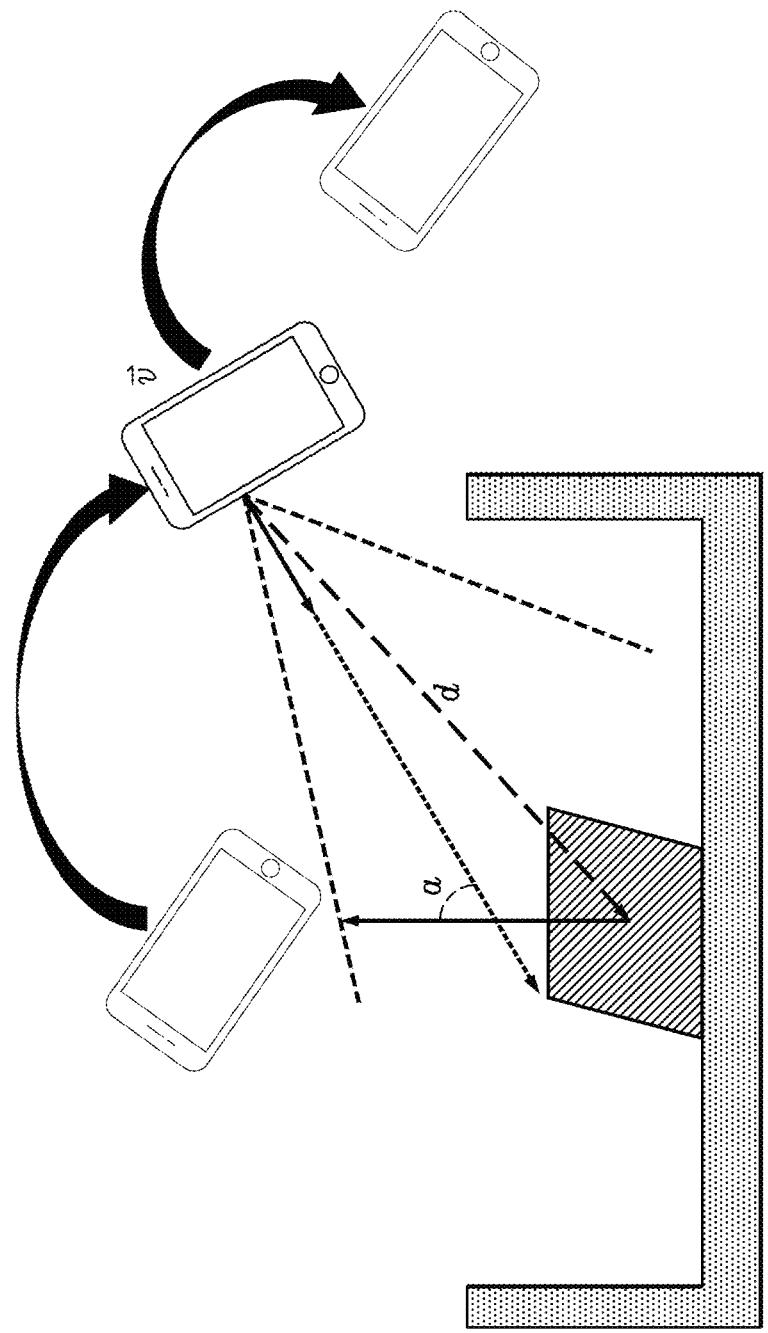
FIG. 12 shows how ROI optimization evaluates the device's moving speed, viewing angle, and distance to select the optimal captured ROI image, according to an embodiment of the invention.

When the user holds the camera over an object, the captured video frames are likely to have varying quality (e.g., blurred images due to fast motion, unclear images due to the viewing angle, or large distance between the camera and object). To ensure robust recognition, one or more embodiments further filter out the ROI images to extract the best-quality image set as input for the visual recognition model. As shown in FIG. 12, for each ROI, keep track of device movement and rotation speed $\vec{v}$, the angle between the camera normal and the ROI normal $\alpha$, and the distance from camera to ROI d. Given a camera pose $\{x_p, y_p, z_p, n_{xp}, n_{yp}, n_{zp}\}$ where $\{x_p, y_p, z_p\}$ is the camera position and $\hat{n}_p = \{n_{xp}, n_{yp}, n_{zp}\}$ is the camera normal, and an ROI $\{x_r, Y_r, z_r, n_{xr}, n_{yr}, n_{zr}, w_r\}$, the distance from the camera to an ROI can be calculated as:

$$d = \sqrt{(x_p - x_r)^2 + (y_p - y_r)^2 + (z_p - z_r)^2}$$

and the angle between the normals of the camera and the ROI is $$\alpha = \frac{\hat{n}_p \cdot \hat{n}_r}{|\hat{n}_p| \cdot |\hat{n}_r|}.$$

The camera's moving/rotation speed is estimated with the camera pose when a frame is captured at $p_t$ and the pose at $\Delta T$ earlier $P_{t-\Delta T}$ ($\Delta T$ is set to 0.1 s in one or more embodiments). The absolute combined moving/rotation speed can be calculated as $|\vec{v}| = |(p_t - p_{t-\Delta T})|$. Normalize the moving speed and rotation speed to balance their contribution to the combined speed before the calculation. One or more embodiments maintain a queue of 5 input images for every ROI, and they are updated every 300 ms if an eligible ROI is captured by popping out the first ROI and pushing the new ROI. Five images is an appropriate value in one or more embodiments because it only requires a small time window of 1.5 s and it minimizes the impact of images captured when the ROI is going out of the FOV. One or more instances feed an ROI image to the queue only if $|\hat{v}| < \delta_v$, $\alpha < 60°$ and d<1 m, where $\delta_v$ is a threshold so that images are not blurred when the device is moving within this threshold (these are empirical numbers we obtained from extensive experiments; $\delta_v$ may be different, for example, for different lighting conditions). To select the optimal ROI, choose the one with the smallest a as it impacts the performance most for the eligible ROIs according to our experiments. Without such queuing and selection, the last update for an ROI usually happens when it is about to exit the FoV, which is not optimal.

Device Movement Feedback.

To ensure good-quality ROI capture, the device camera should be properly positioned. Feedback can be provided through the AR app to guide the user to position the camera such that it is at the right position and that the user is not moving the camera too fast or too far away from the ROIs. The feedback instructions are shown, for example, only when ROI images are not adequately captured. Specifically, if the ROIs are not updated for a period of time (e.g., 10s), which means they are not viewed from appropriate angles or distances, then appropriate instructions will be displayed to ask the user to move the mobile device. On the other hand, if recognition results are ambiguous, instruct the user to move the device toward collecting more ROI images, which are associated with such ambiguous states from ROI identification, until the object state is disambiguated.

Experimental Implementation:

A non-limiting experimental implementation of AFVR included two parts: an off-line model training program that runs on one or more servers, and an on-line mobile AR app that leverages the extracted ROIs and the trained model to perform fine-grained visual recognition.

Off-line Model Training

Training Data Generation.

The ROI cropping during the training data collection produces a plurality of images for each ROI under each object state, which are concatenated as the training image for model training. To minimize the training data collection effort, only require a few minutes of object scanning. Then further enhance the collected data in two steps:

(i) Data Augmentation.

First augment the ROI images leveraging existing approaches such as random rotation, shifts, and shear. Random rotation of the ROI images enables much more robust recognition performance when the object is viewed from random angles. Also shift and shear the ROI images, because the captured ROI image may not be centered and may be off-center in a variety of different ways due to the off-set in ROI tracking caused by device pose estimation error. With such augmentation, populate the images for each ROI under each object state.

(ii) Image Concatenation.

To generate the images that are consumable for model training, the individual images for each ROI should be concatenated. Since these ROI images capture the information of the corresponding ROIs, and they may be captured at different times, they are thus semi-independent of each other. To augment the concatenated images, randomly draw the images from each ROI image set, and concatenate them as a new training sample. This significantly increases the training data amount, and also captures the variety of the combinations of ROI images.

One or more embodiments use the same techniques to generate the training data for both ROI extraction, and the final fine-grained visual recognition model training.

Model Training.

To collect training data, scan the object at each state for approximately 2 mins. Note that it is a one-time effort to build the model for a new object. For evaluation purposes, this training program was run off-line on a PC with a GTX 1080 GPU. The Keras API with TensorFlow backend is used in one or more embodiments for CNN construction and training. After the training, convert the visual recognition model to CoreML format to run on the iOS platform.

On-line Mobile App

We developed an experimental iOS-based mobile application for real-time testing and evaluation. ARKit is used as an AR SDK for re-localization, camera pose tracking and AR experience rendering. The CoreML framework is used for executing on-device machine learning inferences. Schedule a task for real-time recognition and stabilize the result via multiple trials:

Recognition Scheduling.

Schedule a timer to check whether the ROIs are updated every 300 ms, and execute the CNN feature extraction branches, whose input image is updated. Execute the spatial and temporal information aggregation and classification layers once per second if any CNN feature update is triggered. By updating each branch only when the ROI changes, reduce unnecessary computations.

Prediction Stabilization.

To further stabilize the state prediction result, especially during the transitions from one state to another, leverage a rolling average prediction method. Buffer a queue of the latest N prediction results, and only output a final result if one predicted state appears N−1 times out of N.

Evaluation:

The AFVR algorithm was evaluated from multiple aspects: recognition accuracy and impact factors, comparison with existing approaches, and resource overhead.

Recognition Accuracy and Impact Factors: To validate the overall system design, we first evaluated the performance of a naive light-weight CNN model (LW model) with the ROI capturing mechanism, then followed by a comparison against DCL and VGG-based models. The LW model is a two-layer CNN followed by pooling and fully connected layers for classification.

Figure 13:
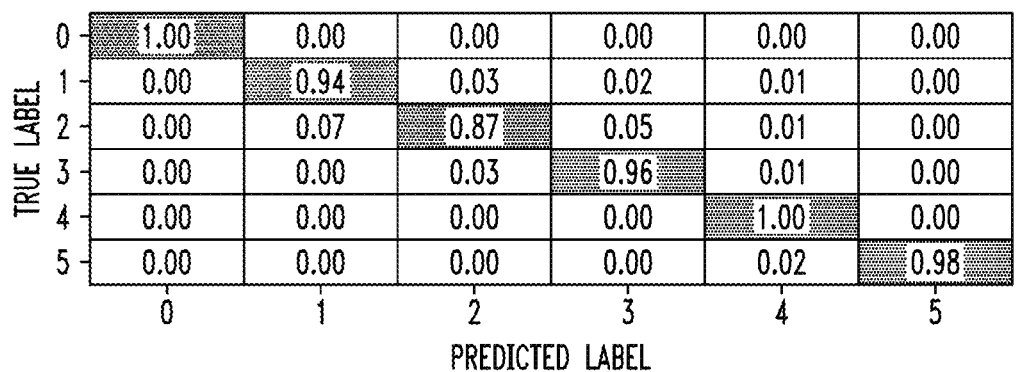
FIG. 13 depicts a confusion matrix of state recognition results, according to an aspect of the invention.

State Recognition Accuracy:

Consider the task of replacing a CPU on a desktop machine, which involves six steps (e.g., removing screws/fan, unplugging wires, releasing CPU latch, etc.). Scan the machine under each state for 2 mins as training data and another 1 min for testing. Video frames are sampled every 300 ms; thus, 1 min/s data collection captures 200 image frames. Extract the ROIs and train the LW model for evaluation. FIG. 13 shows the confusion matrix of the results. The recognition accuracy is close to or above 95% for most states, except state three, which is mis-recognized as adjacent states. This state is easier to be confused with adjacent states, because the visual difference is very small: the fan collector hides deep in the machine, and it is only visible from a very limited number viewing angles. Note that these results are based on individual recognition results. We have found that error results are usually not adjacent to each other; thus, we can further improve the accuracy and stability with multiple trials, which is evaluated later. Nevertheless, the overall results demonstrate that AFVR is robust enough for practical use.

Factors Affecting Model Accuracy:

Data Augmentation.

Figure 14:
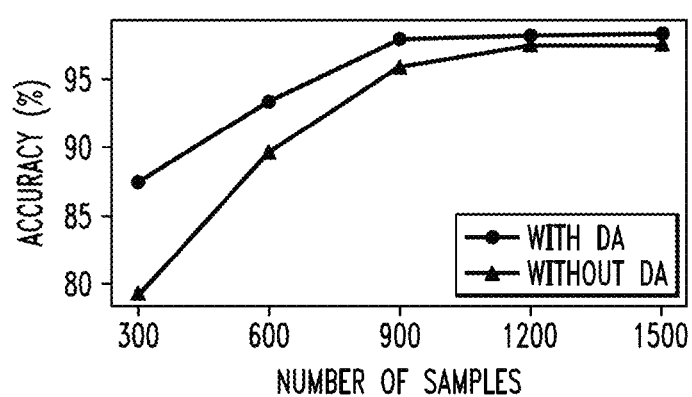
FIG. 14 depicts a recognition accuracy comparison of data augmentation (DA) with different number of training images, according to an aspect of the invention.

We evaluated how effective data augmentation (DA) can improve the performance by populating the training images, especially when training data is limited. FIG. 14 shows the recognition accuracy under different amounts of training samples from 300 to 1500. It can be seen that data augmentation improves the accuracy significantly, especially when the training samples are very limited (e.g., <900). As the size grows, the accuracy performance becomes stable both with and without DA, although still slightly higher with DA, indicating the model generalization improvement of DA.

ROI Size.

Figure 15:
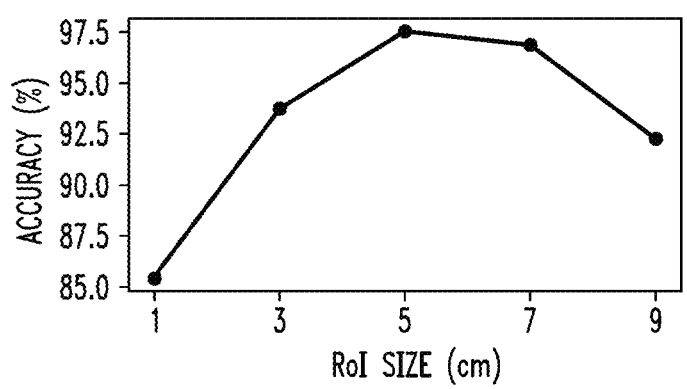
FIG. 15 depicts recognition accuracy with different ROI sizes, according to an aspect of the invention.

The ROI size (the length/width of the square) is pertinent for achieving the best recognition performance. Smaller ROI size enables more focused perception of object parts, and thus more fine-grained recognition, but also leads to smaller coverage area, which may miss the distinguishable parts due to offsets caused by device movements. In such cases, it produces larger errors. Larger ROI size enables larger coverage, thus less possible to miss the distinguishable parts, but at the same time, it also captures more background "noise" and shrinks the resolution of critical areas for state recognition. We evaluated the impact of different ROI sizes on the recognition accuracy. FIG. 15 shows the resulting accuracy with ROI size from 1-9 cm. We collected data with ROI size 1, 3, 5, 7, 9 cm. The experiment shows 5 cm to be the optimal size as it achieves the highest accuracy. Depending on the actual size of the object, the optimal ROI size may differ.

Recognition Stabilization.

Figure 16:
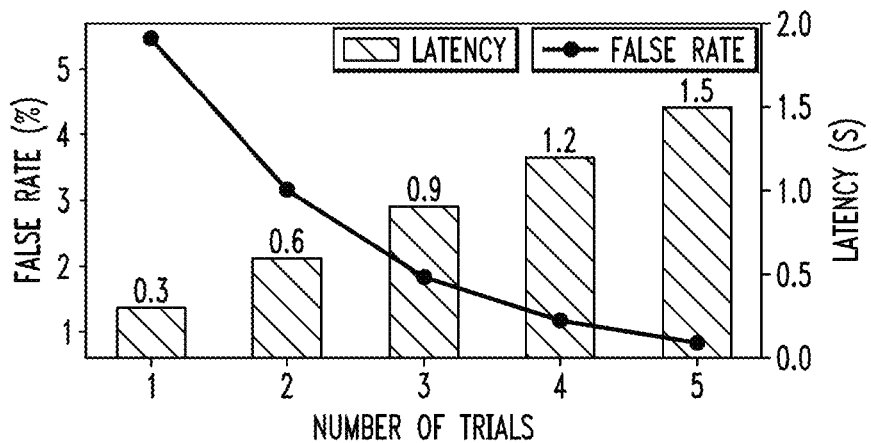
FIG. 16 depicts false rate and latency with different number of trials, according to an aspect of the invention.

It is pertinent to have stable and accurate recognition results as any incorrect recognition triggers irrelevant animations or instructions in the AR application. This is not only disruptive but also confuses users, leading to a poor user experience. We evaluated the false rate (i.e., inaccurate state recognition) and latency when multiple recognition trials were conducted for each cycle. A recognition trial happens, e.g., every 300 ms; thus, one verdict from multiple trials is fast enough, causing no apparent delay to the user. At least N−1 trials must indicate the same result out of N trials in a cycle to declare a state result. FIG. 16 shows that more trials lower the false rate rapidly at the cost of larger latency. This is because more trials give more stable results, thus reducing false results. With five trials, the false rate is less than 0.5%. We chose five trials for each recognition circle to balance the stability and latency. Note that in a practical use case, the object states do not change frequently, and 1-2 s latency is negligible.

Comparison with Existing Approaches

Accuracy Comparison.

Figure 17:
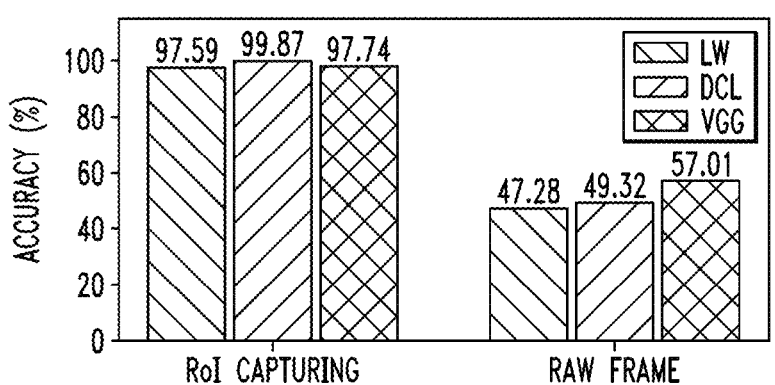
FIG. 17 depicts accuracy of different models with ROI capturing or using raw image frames, according to an aspect of the invention.

We compared the performance of LW, DCL models and a representative object recognition model VGG16. As ROI capturing is a pertinent component for AFVR, we also compared the performance of all models with ROI capturing and raw image frames. We fine-tuned the VGG16 with pre-trained weights from ImageNet, and froze all the layers except the last two fully connected layers while training. FIG. 17 shows the results. With ROI capturing, all three models achieved high accuracy (>97%), and the DCL model has the highest accuracy of 99.87%. The VGG-based model also has an accuracy of 97.74%, which demonstrates the effectiveness of the features extracted by VGG16. The results with ROI capturing are significantly higher than those using raw image frames as input, which achieve only 50% accuracy. This is mainly because of the occlusions and the lack of fine-granularity. The images may look the same for some states if the changing parts are occluded, thus causing a lot of noise in the training and testing data. The VGG-based model has the highest accuracy among the three using raw image frames, even better than the DCL model.

This is probably because the DCL model takes multiple "noisy" frames as input, which is more difficult to converge.

Impact of Number of ROIs.

Figure 18:
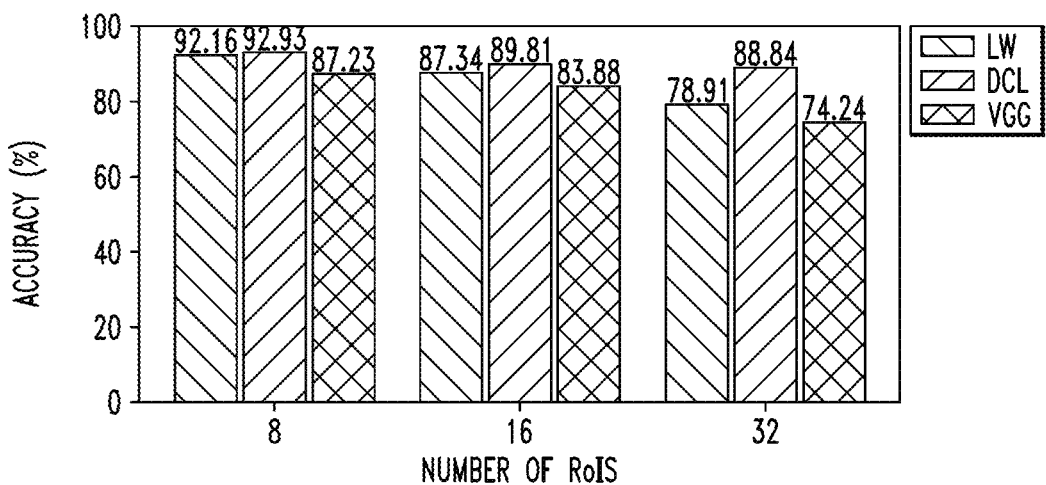
FIG. 18 presents a comparison of accuracy of different models, as the object becomes more complex, requiring more ROIs, according to an aspect of the invention.

As the number of ROIs increases, if the resolution of each ROI does not change, the concatenated image resolution increases. If the concatenated image resolution is fixed, each ROI image resolution shrinks. Images with too large resolution may need to be reshaped to fit into models such as VGG. We collected new data on a more complex object, and we manually added more ROIs. FIG. 18 shows the results for 8, 16, and 32 ROIs. As the number of ROI grows, the VGG model accuracy drops to <75% due to the resizing. LW has better performance than VGG at a cost of increased model size (increasing parameters). The DCL model has the best performance and only shows a marginal decrease in accuracy.

Model Size Comparison.

The size of a model is pertinent for it to be executed efficiently, especially on a resource constrained mobile device. FIG. 19 shows the number of parameters of the three models, as the number of ROIs increases. The VGG-based model has a constant number of 14.85 M as the images are resized to a fixed resolution of 224×224. The DCL model leverages VGG for feature extraction, and thus has more parameters than VGG. The parameter increases by ~1.6 M every additional 9 ROIs (assuming the input image for each branch includes 9 ROIs). The LW model has the fewest parameters when ROI is fewer than 25; after that, it grows significantly faster than the DCL model. Thus, DCL is more suitable for complex objects.

Results on More Objects: To illustrate generalization, we conducted more experiments on five objects including more complex machines such as servers. FIG. 20 shows the boxplot of the accuracy of both LW and DCL models; both of them are above 95%. The DCL model has a higher median accuracy, over 98%.

Resource Overhead: The resource consumption is pertinent for good user experience and usability. We measured the AFVR resource overhead on an iPhone 8, in CPU and memory usage. We compared these metrics when the mobile app is running in different modes: AR only, AR with LW model inference, and AR with DCL model inference. The table of FIG. 21 shows the results of typical measurements for comparison. The visual recognition only slightly raises the CPU by about 1-1.5%, and consumes 30+MB memory. With all the overheads, AFVR can easily achieve 60 fps, causing no overheating for continuous use.

Model Training Overhead.

The model training overhead includes two aspects: data collection overhead and computation overhead. For data collection, a dedicated user can scan the object under each state (each takes about 1-2 mins) or crowdsourced data from remote assist sessions can be leveraged. In its current state, the crowdsourced data is noisy and requires manual pre-processing. For computation overhead, all the data collected on the mobile device is a "byproduct" of AR, thus causing minimum additional overhead. Model training is also lightweight in the backend due to the relatively small data amount for a given object.

More Sophisticated Models.

The exemplary DCL model leveraged VGG16 with pre-trained weights from ImageNet as the base model, which yields reasonable results. Training a base model based on domain specific data set can further improve the accuracy and efficiency. Additionally, more sophisticated neural networks, such as spatial temporal convolutional networks, can be used to improve the performance.

Thus, one or more embodiments provide an Active Fine-Grained Visual Recognition algorithm that combined both 2-D video frames and 3-D feature points in AR to recognize the changing visual state of 3-D objects, even when the change is fairly subtle. One or more embodiments are robust to random camera movements, and provide reliable and stable visual recognition results by implementing through an iOS-based mobile app, which focuses on AR-assisted hardware maintenance.

One or more embodiments specifically focus on fine grained visual state recognition in AR. One or more embodiments do not require pre-scanning and pre-labeling each hardware component and then using some standard pixel level computer vision matching algorithms to detect the hardware component. Pre-scanning or pre-labeling individual parts of the hardware may not always be possible due to inability to isolate from the motherboard. One or more embodiments provide fine grained visual state detection (as opposed to component recognition), which keeps track of even the smallest changes in the scene (such as removing a small screw, lifting up a tiny lever, etc.). This level of recognition is not possible with 3-D point cloud based object or part recognition, and employs novel deep learning techniques disclosed herein. This includes leveraging images, 3-D feature points, and camera poses in AR.

One or more embodiments provide an algorithm for visual recognition. One or more embodiments recognize and understand the current AR scene (i.e., the object state such as cover open vs. cover closed, lever up vs, lever down, screw in vs. screw out, etc.), and present the applicable set of instructions automatically, as not every instruction matches every machine state (e.g., one cannot remove a fan unless one has opened the top cover of the machine). To solve the state recognition problem, one or more embodiments provide a series of deep learning models and techniques leveraging images, 3-D feature points, and camera poses in AR.

One or more embodiments analyze the visual appearances of the ATM to present targeted instructions for that ATM state, including a series of specific deep learning techniques for fine grained visual state detection, such as automatic ROI identification, ROI cropping, occlusion detection using 3-D feature points, and the like.

One or more embodiments provide fine grained object state recognition, which requires analyzing the current scene and predicting the object state. For example, conventional part recognition allows detecting a CPU cover in the scene as one looks at a motherboard, while one or more embodiments detect whether that CPU cover is open or closed, whether its lever is lifted up or is down, essentially very subtle differences in the main scene that regular part detection algorithms are not able to differentiate. Detecting the visual state (along with the subtle changes in the visual state) of an object is a very different task compared to detecting a part of an object. Moreover, one or more embodiments provide a series of techniques, such as automatic ROI identification, ROI cropping, occlusion detection using 3-D feature points, etc.

Previous work requires identification of regions of interest manually (which makes it hard to generalize), and does not support occlusion detection (which causes inefficiency in running the deep learning model for inference for no reason even when the target region is occluded, potentially leading to device heating on mobile devices). Previous work only takes images and camera pose(s) as input, and captures the ROIs one by one, which are fed into a multi-stream CNN for recognition. One or more embodiments learn the ROIs automatically through a deep learning model (no manual effort), leverage a time sequence of input images to ensure higher accuracy, and support occlusion detection with the 3-D feature points detected in real-time. Finally, one or more embodiments capture multiple ROIs concurrently and use an improved deep learning model called multi-stream CNN-LSTM model for recognition.

Again, one or more embodiments allow detecting an object's visual state (such as cover on vs. off, DIMM on vs. off, CPU lever up vs down, etc.). One or more embodiments present a series of image ROI capturing algorithms and neural networks for object state recognition, which involves all the detailed visual appearance of the object, which is more complex than object part detection.

One or more embodiments work on mobile devices with regular cameras (no special equipment needed—can be carried out without a depth-detecting camera) and provide fine grained object state detection. In the context of the technical support domain, prior art algorithms would enable recognizing that what the AR system is looking at is a laptop, while one or more embodiments help detect the state of the laptop (e.g., CPU lever down) to enable the AR system to present the right instruction (e.g., lift up the CPU cover). Knowing that the object is a laptop (i.e., high level object recognition) is not sufficient to present the right level of repair instructions, and a finer level of detection granularity is advantageously provided by one or more embodiments.

Again, one or more embodiments provide a method for fine grained object state recognition in AR, fully taking advantage of the AR outputs, such as camera pose information and 3-D object models. In addition, one or more embodiments address the occlusion problem to increase the efficiency and accuracy of the deep learning model with the detected 3-D feature points from AR. Regarding active view selection policy, one or more embodiments can identify which ROIs need to be scanned and guide the users to move the cameras in AR scenes.

Unlike prior art general object classification, one or more embodiments provide fine-grained visual recognition where distinguishable areas may only be visible from a specific viewing angle. One or more embodiments do not require taking a fixed number of images, but capture the pertinent ROIs automatically through camera pose tracking and 3-D-2-D projection. One or more embodiments leverage LSTM layers to aggregate temporal information.

Given the discussion thus far, it will be appreciated that, in general terms, an exemplary method, according to an aspect of the invention, includes obtaining access to a three-dimensional point cloud representation 505 of an object 502 including poses of a scanning digital camera (e.g. in phone 569) and corresponding video frames; this step can be carried out, for example, by scanning the object with a digital camera coupled to a processor and collecting the poses, corresponding video frames, and corresponding feature points. In one or more embodiments, the poses/points/frames are, advantageously, byproducts of AR. It is worth noting that, heretofore, images alone have typically been relied on for visual recognition; one or more embodiments, in contrast, embed the results of the model into augmented reality, thus providing a medium through which poses, feature points, frames, and the like are generated in the AR environment. One or more embodiments create novel models that leverage these AR byproducts. Refer to ROI capturing 589 in on-line phase 405—the camera pose can be leveraged because the ROIs define 3-D locations in 3-D space. It is desired to crop the images around the ROI. Projection of 3-D locations to 2-D images is carried out. The camera pose is employed to carry out the projection/cropping. The point cloud is used for occlusion detection, as seen in FIG. 11.

Further steps include, at 515, down-sampling the three-dimensional point cloud representation to obtain a set of region-of-interest candidates 525-1 through 525-7; filtering the region-of-interest candidates to select those of the region-of-interest candidates having appearance changes, which distinguish different visual states, as selected regions of interest 535, based at least in part on the poses of the camera; generating region of interest images 415 for the selected regions of interest from corresponding ones of the video frames; and, at step 419, training a deep learning recognition model based on the region of interest images.

Some instances further include, as at 405, determining a visual state of the object with the digital camera coupled to the processor, using the trained deep learning recognition model.

Some embodiments further include, as at 1013, providing augmented reality instructions, related to the object, to a user, based on the determined state. For example, a database can be included in the AR system which has instructions for superposition over a view of the object stored in connection with a visual state of the object. Such a database can be in local storage in a device 569 and/or can be stored in a cloud as described with regard to FIGS. 1 and 2. When the state is determined, query the database for the corresponding instructions and display them on a screen of device 569 superimposed over the view of the object. Display 24 is generally representative of such a screen.

Some instances further include, as at 404, re-localizing the digital camera with respect to the object prior to determining the state of the object.

In some cases, the down-sampling of the three-dimensional point cloud representation to obtain the set of region-of-interest candidates includes, as shown at 511, removing outliers.

In some cases, the filtering of the region-of-interest candidates to select those of the region-of-interest candidates having the appearance changes includes, as at 537, image cropping and zooming.

In some instances, determining the state of the object includes, as at 709, capturing images for those of the regions of interest having occupied voxels of interest; and providing a corresponding zoomed local image and viewing pose 711 for each of the regions of interest having the occupied voxels to the recognition model 545.

In some embodiments, the model includes a multi-stream convolutional neural network long short-term memory model; and the determining of the state of the object includes: separating the regions of interest into a plurality of branches 803-1 . . . 803-K; as at 805, extracting features from the corresponding zoomed local images using a convolutional neural network of the multi-stream convolutional neural network long short-term memory model; as at 809, aggregating spatial information by concatenating the extracted features; and, as at 813, aggregating temporal information by pooling the spatial information for a plurality of time steps and providing the pooled information to a long short-term memory layer 815 to obtain a fully connected layer 817 for classification to determine the state of the object.

One or more embodiments further include refraining from capturing images for those of the regions of interest not having occupied voxels of interest, to reduce sensitivity to at least one of occlusions and camera instability, as depicted at 708, 709.

In one or more embodiments, the object 502 includes an information technology asset to be repaired, the digital camera and the processor are part of a mobile device 569, 54A, and the providing of the augmented reality instructions includes illustrating a repair procedure for the information technology asset. A further step can include repairing the asset in accordance with the instructions.

Figure 22:
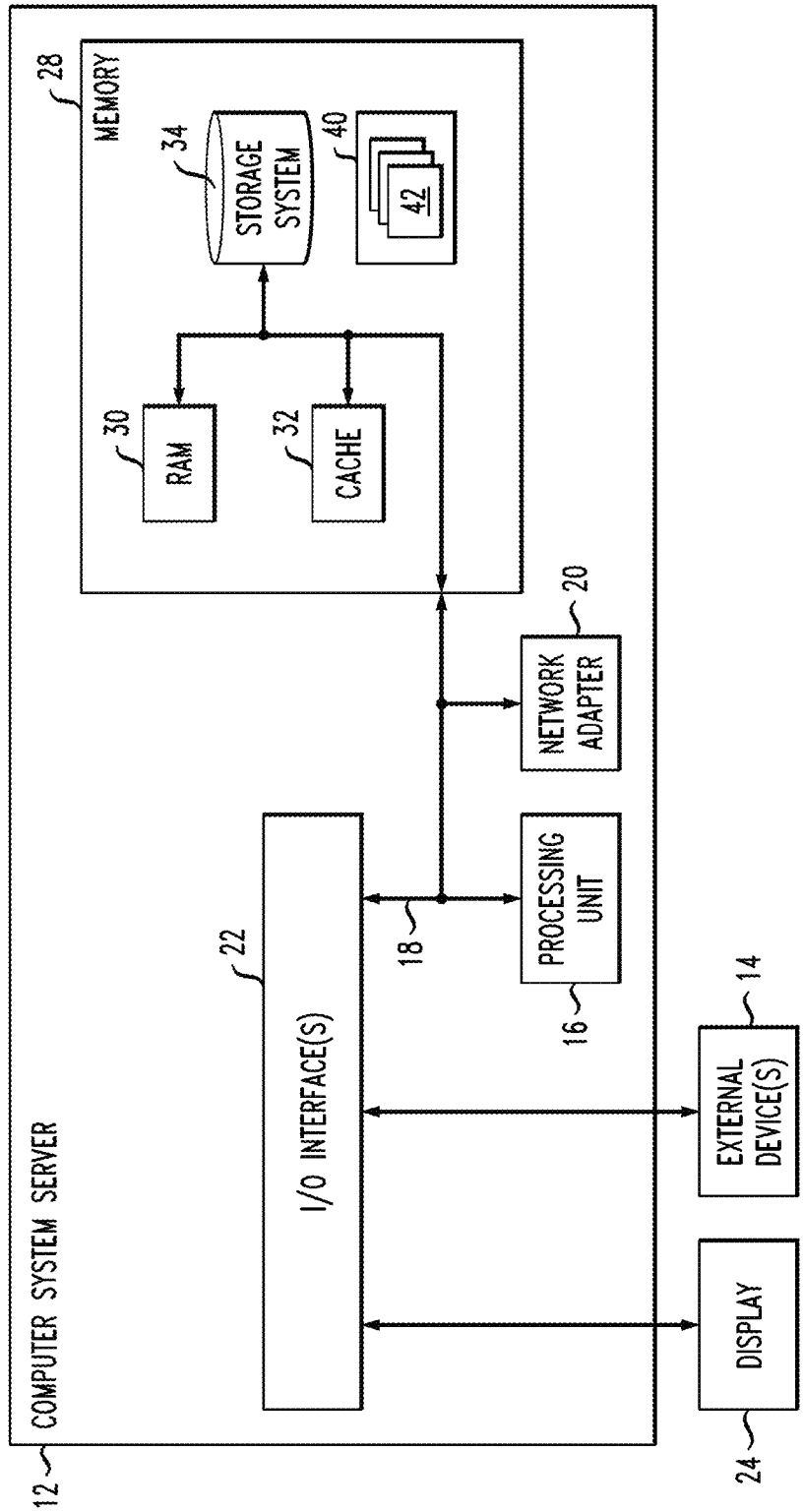
FIG. 22 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 22 depicts a computer system that may be useful in implementing one or more aspects and/or elements of the invention, also representative of a cloud computing node according to an embodiment of the present invention. Referring now to FIG. 22, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 22, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 22, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 22) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a cloud-based service 96 for fine-grained visual recognition in mobile augmented reality, located in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining access to a three-dimensional point cloud representation of an object including poses of a scanning digital camera and corresponding video frames;
    down-sampling said three-dimensional point cloud representation to obtain a set of region-of-interest candidates;
    filtering said region-of-interest candidates to select those of said region-of-interest candidates having appearance changes, which distinguish different visual states, as selected regions of interest, based at least in part on said poses of said camera;
    generating region of interest images for said selected regions of interest from corresponding ones of said video frames; and
    training a deep learning recognition model based on said region of interest images.

2. The method of claim 1, further comprising determining a visual state of said object with said digital camera coupled to a processor, using said trained deep learning recognition model.

3. The method of claim 2, further comprising providing augmented reality instructions, related to said object, to a user, based on said determined state.

4. The method of claim 3, further comprising re-localizing said digital camera with respect to said object prior to determining said state of said object.

5. The method of claim 4, wherein said down-sampling of said three-dimensional point cloud representation to obtain said set of region-of-interest candidates includes removing outliers.

6. The method of claim 5, wherein said filtering of said region-of-interest candidates to select those of said region-of-interest candidates having said appearance changes comprises image cropping and zooming.

7. The method of claim 4, wherein said determining of said state of said object comprises:
    capturing images for those of said regions of interest having occupied voxels of interest;
    providing a corresponding zoomed local image and viewing pose for each of said regions of interest having said occupied voxels to said recognition model.

8. The method of claim 7, wherein:
    said model comprises a multi-stream convolutional neural network long short-term memory model; and
    said determining of said state of said object comprises:
        separating said regions of interest into a plurality of branches;

extracting features from said corresponding zoomed local images using a convolutional neural network of said multi-stream convolutional neural network long short-term memory model;
aggregating spatial information by concatenating said extracted features;
aggregating temporal information by pooling said spatial information for a plurality of time steps and providing said pooled information to a long short-term memory layer to obtain a fully connected layer for classification to determine said state of said object.

9. The method of claim 7, further comprising refraining from capturing images for those of said regions of interest not having occupied voxels of interest, to reduce sensitivity to at least one of occlusions and camera instability.

10. The method of claim 3, wherein said object comprises an information technology asset to be repaired, said digital camera and said processor are part of a mobile device, and said providing of said augmented reality instructions comprises illustrating a repair procedure for said information technology asset.

11. A non-transitory computer readable medium comprising computer executable instructions which when executed by a computer cause the computer to perform a method of:
obtaining access to a three-dimensional point cloud representation of an object including poses of a scanning digital camera and corresponding video frames;
down-sampling said three-dimensional point cloud representation to obtain a set of region-of-interest candidates;
filtering said region-of-interest candidates to select those of said region-of-interest candidates having appearance changes, which distinguish different visual states, as selected regions of interest, based at least in part on said poses of said camera;
generating region of interest images for said selected regions of interest from corresponding ones of said video frames; and
training a deep learning recognition model based on said region of interest images.

12. The non-transitory computer readable medium of claim 11, wherein the method further comprises determining a visual state of said object with said digital camera coupled to a processor, using said trained deep learning recognition model.

13. The non-transitory computer readable medium of claim 12, wherein the method further comprises providing augmented reality instructions, related to said object, to a user, based on said determined state.

14. The non-transitory computer readable medium of claim 13, wherein the method further comprises re-localizing said digital camera with respect to said object prior to determining said state of said object.

15. The non-transitory computer readable medium of claim 14, wherein:
said down-sampling of said three-dimensional point cloud representation to obtain said set of region-of-interest candidates includes removing outliers; and
said filtering of said region-of-interest candidates to select those of said region-of-interest candidates having said appearance changes comprises image cropping and zooming.

16. The non-transitory computer readable medium of claim 14, wherein:
said determining of said state of said object comprises:
capturing images for those of said regions of interest having occupied voxels of interest;
providing a corresponding zoomed local image and viewing pose for each of said regions of interest having said occupied voxels to said recognition model;
said model comprises a multi-stream convolutional neural network long short-term memory model; and
said determining of said state of said object further comprises:
separating said regions of interest into a plurality of branches;
extracting features from said corresponding zoomed local images using a convolutional neural network of said multi-stream convolutional neural network long short-term memory model;
aggregating spatial information by concatenating said extracted features; and
aggregating temporal information by pooling said spatial information for a plurality of time steps and providing said pooled information to a long short-term memory layer to obtain a fully connected layer for classification to determine said state of said object.

17. The non-transitory computer readable medium of claim 16, wherein the method further comprises refraining from capturing images for those of said regions of interest not having occupied voxels of interest, to reduce sensitivity to at least one of occlusions and camera instability.

18. The non-transitory computer readable medium of claim 13, wherein said object comprises an information technology asset to be repaired, and said providing of said augmented reality instructions comprises illustrating a repair procedure for said information technology asset.

19. An apparatus comprising:
a memory; and
at least one processor, coupled to said memory, and operative to:
obtain access to a three-dimensional point cloud representation of an object including poses of a scanning digital camera and corresponding video frames;
down-sample said three-dimensional point cloud representation to obtain a set of region-of-interest candidates;
filter said region-of-interest candidates to select those of said region-of-interest candidates having appearance changes, which distinguish different visual states, as selected regions of interest, based at least in part on said poses of said camera;
generate region of interest images for said selected regions of interest from corresponding ones of said video frames; and
train a deep learning recognition model based on said region of interest images.

20. The apparatus of claim 19, wherein said at least one processor is further operative to determine a visual state of said object with said digital camera, said digital camera being coupled to said processor, using said trained deep learning recognition model.

21. The apparatus of claim 20, wherein said at least one processor is further operative to provide augmented reality instructions, related to said object, to a user, based on said determined state.

22. The apparatus of claim 21, wherein said at least one processor is further operative to re-localize said digital camera with respect to said object prior to determining said state of said object.

23. The apparatus of claim 22, wherein:
said down-sampling of said three-dimensional point cloud representation to obtain said set of region-of-interest candidates includes removing outliers;
said filtering of said region-of-interest candidates to select those of said region-of-interest candidates having said appearance changes comprises image cropping and zooming; and
said determining of said state of said object comprises:
 capturing images for those of said regions of interest having occupied voxels of interest;
 providing a corresponding zoomed local image and viewing pose for each of said regions of interest having said occupied voxels to said recognition model.

24. The apparatus of claim 23, wherein:
said model comprises a multi-stream convolutional neural network long short-term memory model; and
said determining of said state of said object comprises:
 separating said regions of interest into a plurality of branches;
 extracting features from said corresponding zoomed local images using a convolutional neural network of said multi-stream convolutional neural network long short-term memory model;
 aggregating spatial information by concatenating said extracted features; and
 aggregating temporal information by pooling said spatial information for a plurality of time steps and providing said pooled information to a long short-term memory layer to obtain a fully connected layer for classification to determine said state of said object; and
said at least one processor is further operative to refrain from capturing images for those of said regions of interest not having occupied voxels of interest, to reduce sensitivity to at least one of occlusions and camera instability.

25. The apparatus of claim 21, wherein said object comprises an information technology asset to be repaired, said digital camera and said processor are part of a mobile device, and said providing of said augmented reality instructions comprises illustrating a repair procedure for said information technology asset.

\* \* \* \* \*